US012587915B2

(12) United States Patent
Zhang et al.

(10) Patent No.: US 12,587,915 B2
(45) Date of Patent: Mar. 24, 2026

(54) SYSTEM AND METHOD FOR MOBILITY ENHANCEMENTS

(71) Applicant: ZTE CORPORATION, Shenzhen (CN)

(72) Inventors: Mengjie Zhang, Shenzhen (CN); He Huang, Shenzhen (CN); Jing Liu, Shenzhen (CN); Li Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 511 days.

(21) Appl. No.: 17/960,223

(22) Filed: Oct. 5, 2022

(65) Prior Publication Data

US 2023/0097891 A1     Mar. 30, 2023

Related U.S. Application Data

(63) Continuation of application No. PCT/CN2020/084049, filed on Apr. 9, 2020.

(51) Int. Cl.
*H04W 36/00* (2009.01)
*H04W 36/36* (2009.01)

(52) U.S. Cl.
CPC ... *H04W 36/0061* (2013.01); *H04W 36/0069* (2018.08); *H04W 36/00837* (2018.08); *H04W 36/362* (2023.05)

(58) Field of Classification Search
CPC ......... H04W 36/0061; H04W 36/0069; H04W 36/00837; H04W 36/362
See application file for complete search history.

(56) References Cited

U.S. PATENT DOCUMENTS

| | | | | |
|---|---|---|---|---|
| 2022/0030488 A1* | 1/2022 | Han | ...................... | H04L 5/0035 |
| 2022/0256411 A1* | 8/2022 | Liu | .................. | H04W 36/00698 |
| 2023/0370936 A1* | 11/2023 | Eklöf | .............. | H04W 36/00692 |
| 2023/0379788 A1* | 11/2023 | Eklöf | ................... | H04W 76/30 |

FOREIGN PATENT DOCUMENTS

| | | |
|---|---|---|
| CN | 110741726 A | 1/2020 |
| EP | 3 550 877 A1 | 10/2019 |

(Continued)

OTHER PUBLICATIONS

First Office Action for CN Appl. No. 202080099541.8, dated Jul. 13, 2024 (with English translation, 17 pages).

(Continued)

*Primary Examiner* — Dady Chery
(74) *Attorney, Agent, or Firm* — Foley & Lardner LLP

(57) ABSTRACT

A system and method for improving mobility performance. The system and method include receiving, by a target master wireless communication node (MN) from a source master wireless communication node (MN), a handover request to begin a handover procedure; and transmitting, by the target MN to a target secondary wireless communication node (SN), a first message to inform the target SN about a type of SN addition or change procedure to perform the handover request, wherein the first message causes the target SN to send a second message to the target MN to inform the target MN of one or more configured primary secondary (PSCells).

16 Claims, 15 Drawing Sheets

(56)                    References Cited

FOREIGN PATENT DOCUMENTS

WO      WO-2018/000441  A1      1/2018
WO      WO-2019/240770  A1      12/2019

OTHER PUBLICATIONS

CATT: "Report on Email Discussion [107b#52][NR MobE] Open Issues Conditional PSCell Addition/Change (CATT)" 3GPP TSG-RAN WG2 Meeting #108; R2-1916300; Nov. 22, 2019; Reno, USA (4 pages).
CMCC: "Discussion on CHO for DC scenarios" 3GPP TSG-RAN WG2 Meeting #109; R2-2000918; Athens, Greece; Feb. 29, 2020 (6 pages).
International Search Report and Written Opinion for PCT Appl. No. PCT/CN2020/084049 dated Jan. 4, 2021 (8 pages).
"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 , RAN WG2, V16.1.0, Apr. 7, 2020 (74 pages).
CATT: "Consideration on Conditional SN Addition Procedure", 3GPP TSG-RAN3, Meeting #106, R3-196724, Reno, NV, Nov. 9, 2019 (3 pages).
Ericsson: "Major CHO issues not discussed in [108#66][NR Mob]", 3GPP Draft; R2-2000330, 3GPP TSG-RAN WG2, #109, e-Meeting; Feb. 13, 2020 (8 pages).
Extended European Search Report on EP Appl No. 20896432.0, dated Jun. 6, 2023 (11 pages).
Huawei: "(TP for LTE_feMob BL CR for TS 36.423): Conditional SN Change in MR-DC", 3GPP TSG-RAN3, Meeting #106; R3-196907, Reno, NV, Nov. 9, 2016 (26 pages).
Qualcomm Incorporated: "Conditional NR SN Addition/Change Procedures", 3GPP TSG-RAN WG3 Meeting #105bis, R3-195491, Chongqing, CN; Oct. 5, 2019 (7 pages).
ZTE: "Discussion on CHO with CPA", 3GPP Draft; R3-224269, 3GPP TSG-RAN WG3 #117-e, e-Meeting, Aug. 9, 2022 (3 pages).

* cited by examiner

600

700

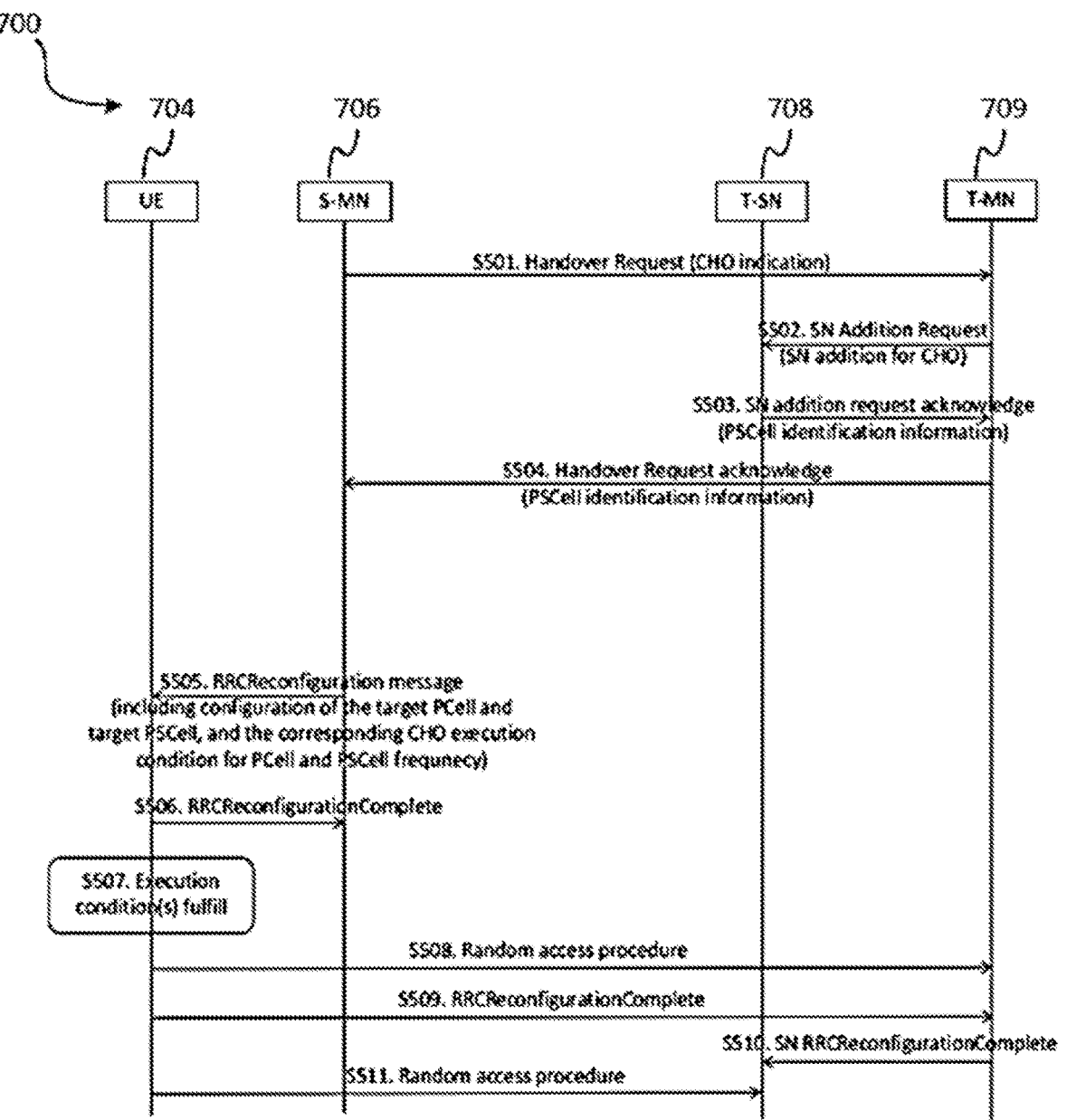

704     706     708     709

UE     S-MN     T-SN     T-MN

S501. Handover Request (CHO indication)

S502. SN Addition Request
(SN addition for CHO)

S503. SN addition request acknowledge
(PSCell identification information)

S504. Handover Request acknowledge
(PSCell identification information)

S505. RRCReconfiguration message
(including configuration of the target PCell and
target PSCell, and the corresponding CHO execution
condition for PCell and PSCell frequnecy)

S506. RRCReconfigurationComplete

S507. Execution
condition(s) fulfill

S508. Random access procedure

S509. RRCReconfigurationComplete

S510. SN RRCReconfigurationComplete

S511. Random access procedure

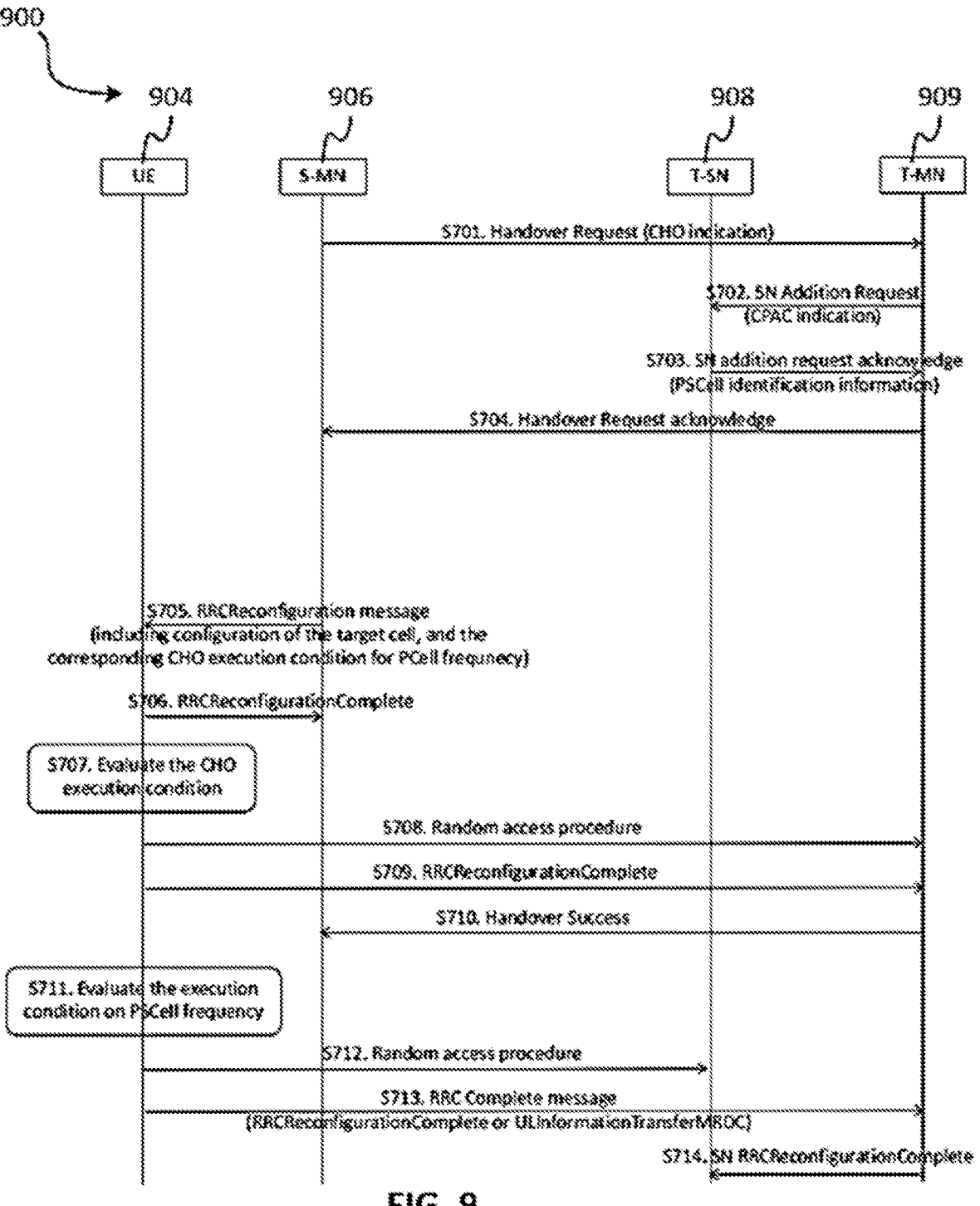

904       906                          908          909

| UE | S-MN | T-SN | T-MN |

S701. Handover Request (CHO indication)

S702. SN Addition Request
(CPAC indication)

S703. SN addition request acknowledge
(PSCell identification information)

S704. Handover Request acknowledge

S705. RRCReconfiguration message
(including configuration of the target cell, and the
corresponding CHO execution condition for PCell frequency)

S706. RRCReconfigurationComplete

S707. Evaluate the CHO
execution condition

S708. Random access procedure

S709. RRCReconfigurationComplete

S710. Handover Success

S711. Evaluate the execution
condition on PsCell frequency

S712. Random access procedure

S713. RRC Complete message
(RRCReconfigurationComplete or ULInformationTransferMRDC)

S714. SN RRCReconfigurationComplete

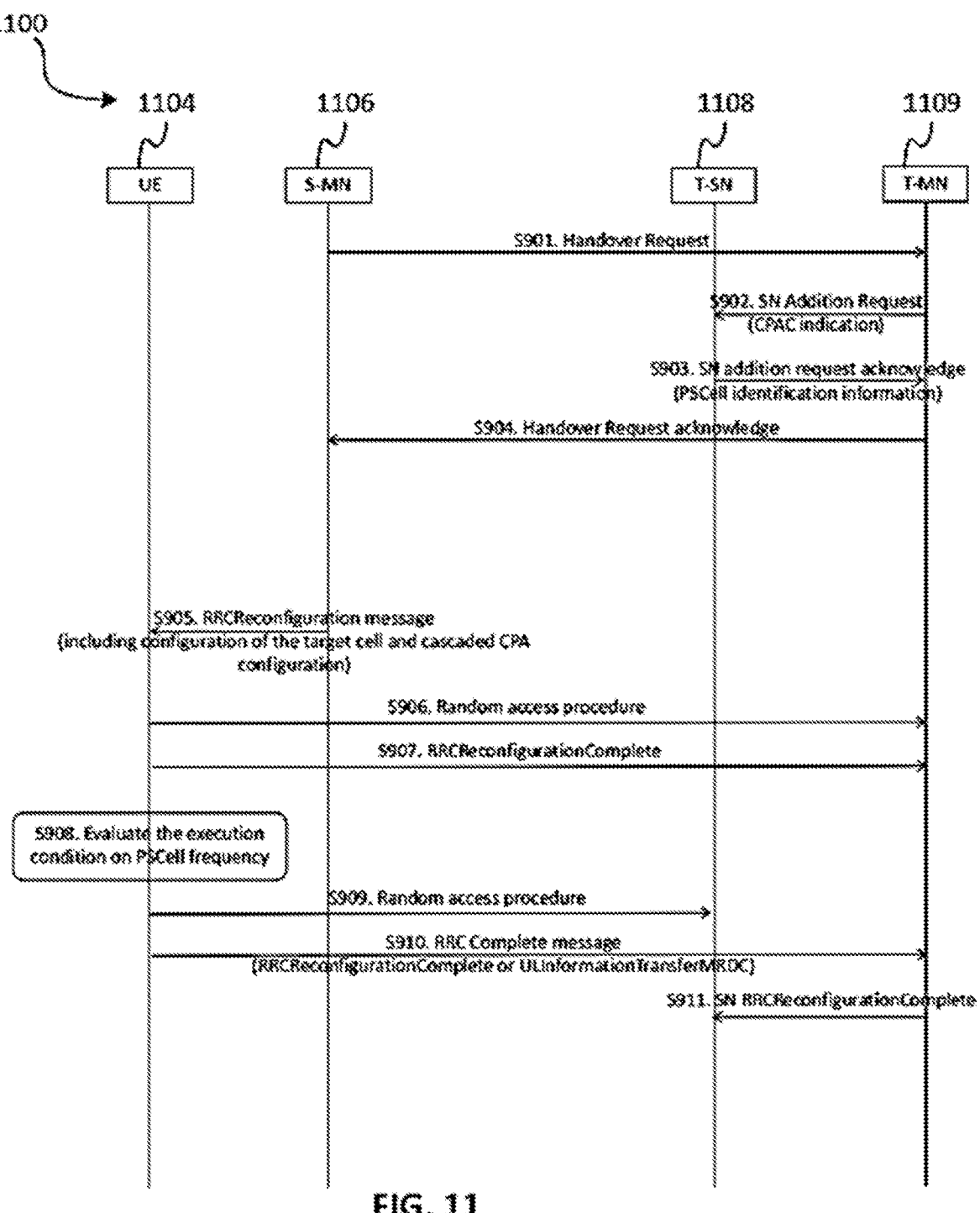

1104
UE

1106
S-MN

1108
T-SN

1109
T-MN

S901. Handover Request

S902. SN Addition Request
(CPAC indication)

S903. SN addition request acknowledge
(PSCell identification information)

S904. Handover Request acknowledge

S905. RRCReconfiguration message
(including configuration of the target cell and cascaded CPA configuration)

S906. Random access procedure

S907. RRCReconfigurationComplete

S908. Evaluate the execution
condition on PSCell frequency

S909. Random access procedure

S910. RRC Complete message
(RRCReconfigurationComplete or ULInformationTransferMRDC)

S911. SN RRCReconfigurationComplete

FIG. 11

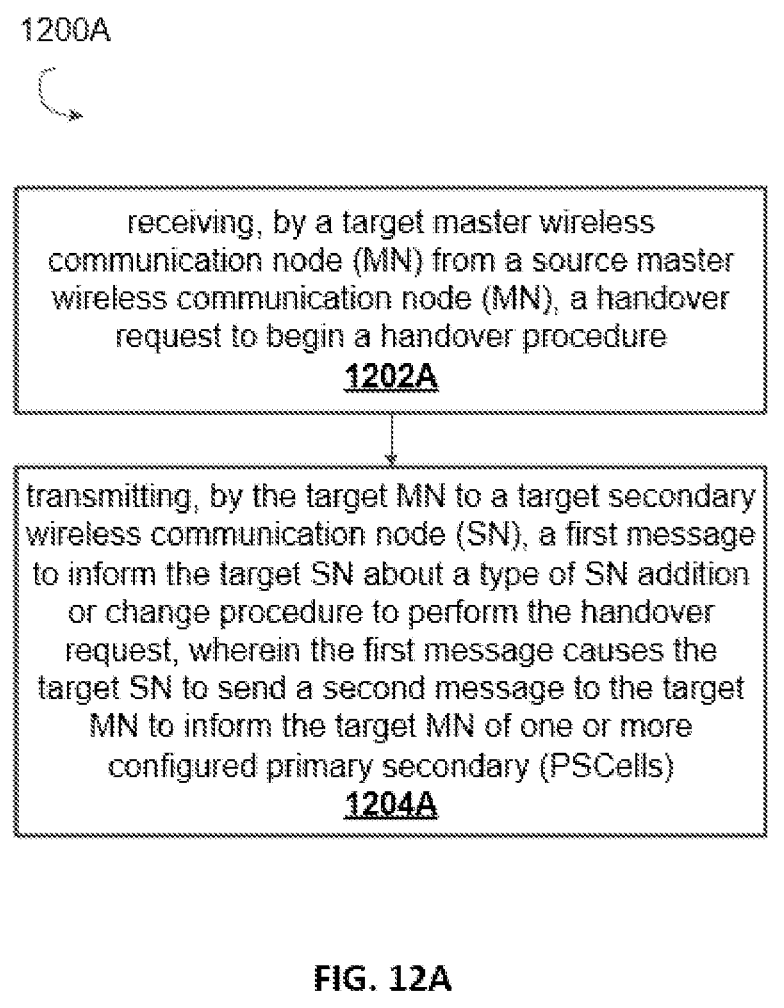

1200A receiving, by a target master wireless
communication node (MN) from a source master
wireless communication node (MN), a handover
request to begin a handover procedure
1202A transmitting, by the target MN to a target secondary
wireless communication node (SN), a first message
to inform the target SN about a type of SN addition
or change procedure to perform the handover
request, wherein the first message causes the
target SN to send a second message to the target
MN to inform the target MN of one or more
configured primary secondary (PSCells)
1204A

FIG. 12A

Figure 12B:
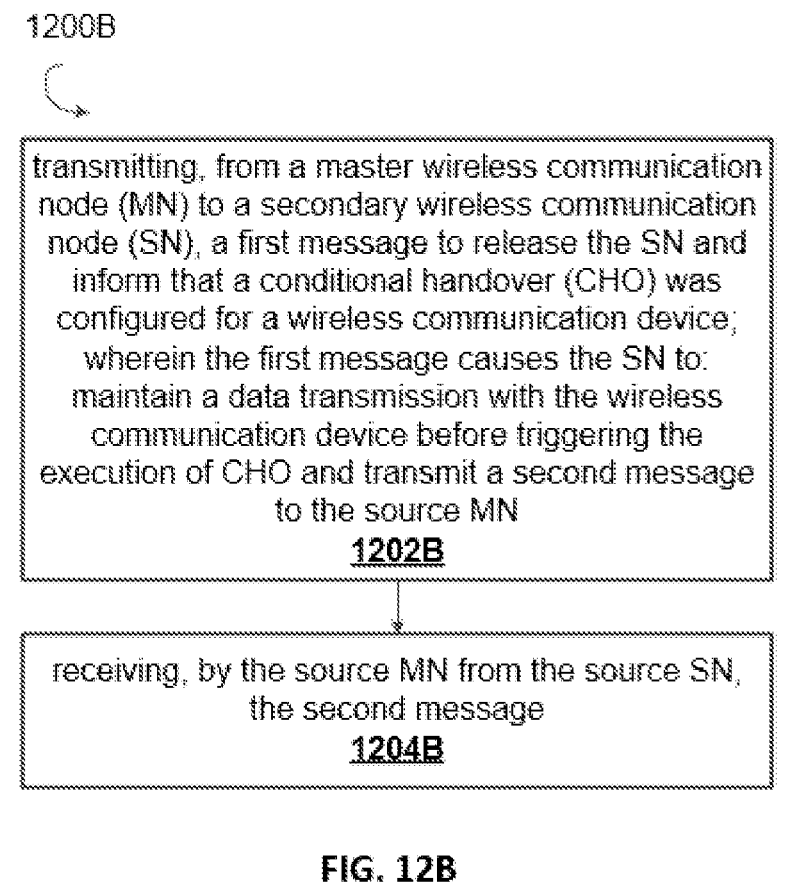

1200B transmitting, from a master wireless communication node (MN) to a secondary wireless communication node (SN), a first message to release the SN and inform that a conditional handover (CHO) was configured for a wireless communication device; wherein the first message causes the SN to: maintain a data transmission with the wireless communication device before triggering the execution of CHO and transmit a second message to the source MN
1202B receiving, by the source MN from the source SN, the second message
1204B

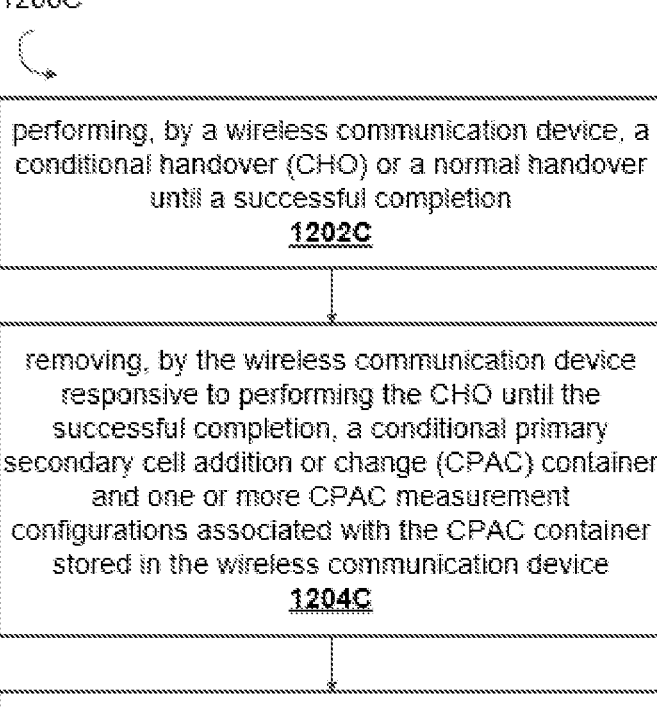

performing, by a wireless communication device, a conditional handover (CHO) or a normal handover until a successful completion
1202C removing, by the wireless communication device responsive to performing the CHO until the successful completion, a conditional primary secondary cell addition or change (CPAC) container and one or more CPAC measurement configurations associated with the CPAC container stored in the wireless communication device
1204C transmitting, by the wireless communication device, a radio resource control (RRC) message to a wireless communication node to inform that the wireless communication device released a CPAC configuration associated with the CPAC container
1206C

SYSTEM AND METHOD FOR MOBILITY ENHANCEMENTS

CROSS-REFERENCE TO RELATED APPLICATION

This application claims the benefit of priority under 35 U.S.C. § 120 as a continuation of PCT Patent Application No. PCT/CN2020/084049, filed on Apr. 9, 2020, the disclosure of which is incorporated herein by reference in its entirety.

TECHNICAL FIELD

The disclosure relates generally to wireless communications and, more particularly, to systems and methods for mobility enhancements.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

One aspect disclosed herein is directed to a method for mobility enhancements. The method includes receiving, by a target master wireless communication node (MN) from a source master wireless communication node (MN), a handover request to begin a handover procedure; transmitting, by the target MN to a target secondary wireless communication node (SN), a first message to inform the target SN about a type of SN addition or change procedure to perform the handover request, wherein the first message causes the target SN to send a second message to the target MN to inform the target MN of one or more configured primary secondary (PSCells);

In some embodiments, the method includes transmitting, by the target MN to the source MN, a third message to inform the target MN of the one or more configured PSCells.

In some embodiments, the target MN transmits the first message to the target SN via X2/Xn signaling, wherein the first message includes an information element that includes a conditional primary secondary cell addition or change (CPAC) indicator or a normal PSCell addition or change for conditional handover (CHO) indicator.

In some embodiments, the target MN transmits the first message to the target SN via X2/Xn signaling, wherein the first message includes a cause value corresponding to a conditional primary secondary cell addition or change (CPAC) indicator or a normal PSCell addition or change for conditional handover (CHO) indicator.

In some embodiments, the target SN transmits the second message to the target MN via X2/Xn signaling, wherein the second message includes an information element indicating a cell identification information for the one or more configured PSCells, wherein the cell identification information includes at least one of a PSCell frequency and a physical cell identifier (PCI), a candidate cell identifier, and a cell global identity (CGI).

In some embodiments, the third message includes an information element indicating a cell identification information for the one or more configured PSCells, wherein the cell identification information includes at least one of a PSCell frequency and a physical cell identifier (PCI), a candidate cell identifier, and a cell global identity (CGI).

In some embodiments, the method includes transmitting, from a master wireless communication node (MN) to a secondary wireless communication node (SN), a first message to release the SN and inform that a conditional handover (CHO) was configured for a wireless communication device; wherein the first message causes the SN to: maintain a data transmission with the wireless communication device before triggering the execution of CHO and transmit a second message to the source MN; and receiving, by the source MN from the source SN, the second message.

In some embodiments, the first message includes an information element that includes at least one of a conditional handover (CHO) indicator, a SN mobility for CHO indicator, and an early data forwarding indicator.

In some embodiments, the first message includes a cause value corresponding to at least one of a conditional handover (CHO) indicator, a SN mobility for CHO indicator, and an early data forwarding indicator.

In some embodiments, the first message further causes the SN to begin forwarding data.

In another aspect disclosed herein is directed to a method for mobility enhancements. The method includes performing, by a wireless communication device, a conditional handover (CHO) or a normal handover until a successful completion; removing, by the wireless communication device responsive to performing the CHO or normal handover until the successful completion, a conditional primary secondary cell addition or change (CPAC) container and one or more CPAC measurement configurations associated with the CPAC container stored in the wireless communication device; and transmitting, by the wireless communication device, a radio resource control (RRC) message to a wireless communication node to inform that the wireless communication device released a CPAC configuration associated with the CPAC container.

In some embodiments, the method includes stopping, by the wireless communication device, an evaluation of one or more CPAC execution conditions.

In some embodiments, the RRC message includes an information element that includes at least one of a release indicator, a release indicator and associated released cell information, and a released cell information, wherein the released cell information includes at least one of a PSCell frequency and a physical cell identifier (PCI), a candidate cell identifier, and a conditional reconfiguration index.

In some embodiments, the CPAC container corresponds to all stored CPAC containers, wherein the RRC message informs that the wireless communication device released all CPAC configurations associated with the CPAC containers.

In some embodiments, the CPAC container corresponds to one or more invalid CPAC containers, wherein the RRC message informs the wireless communication device released one or more CPAC configurations associated with the one or more invalid CPAC containers and the method includes determining, by the wireless communication device, an existence of valid CPAC containers; and restarting, by the wireless communication device responsive to determining the existence of the valid CPAC containers, an evaluation of one or more CPAC execution conditions.

In some embodiments, the RRC messages causes the wireless communication node to transfer a second message to a secondary wireless communication node (SN) via X2/Xn signaling, to inform the SN to release a CPAC configuration associated with the CPAC container.

In some embodiments, the second message includes an information element that includes at least one of a release indicator, a release indicator and associated released cell information, a released cell information, wherein the released cell information includes at least one of a PSCell frequency and a physical cell identifier (PCI), a candidate cell identifier, a conditional reconfiguration index, and a global cell identifier (CGI).

In some embodiments, the method includes transmitting, by the wireless communication device, the RRC message to a wireless communication node via a signaling radio bearer (SRB) type corresponding to SRB3.

In some embodiments, the method includes receiving, by a wireless communication node from a wireless communication device, a radio resource control (RRC); and acknowledging, by the wireless communication node, that the wireless communication device released a CPAC configuration associated with the CPAC container.

In some embodiments, prior to the wireless communication node receiving the RCC, the wireless communication device: performed a conditional handover (CHO) or a normal handover until a successful completion, and removed a conditional primary secondary cell addition or change (CPAC) container and one or more CPAC measurement configurations associated with the CPAC container stored in the wireless communication device.

In some embodiments, prior to the wireless communication node receiving the RCC, the wireless communication device stopped an evaluation of one or more CPAC execution conditions.

In some embodiments, the RRC message includes an information element that includes at least one of a release indicator, a release indicator and associated released cell information, a released cell information, wherein the released cell information includes at least one of a PSCell frequency and a physical cell identifier (PCI), a candidate cell identifier, and a conditional reconfiguration index.

In some embodiments, the CPAC container corresponds to all stored CPAC containers, wherein the RRC message informs that the wireless communication device released all CPAC configurations associated with the CPAC containers.

In some embodiments, the CPAC container corresponds to one or more invalid CPAC containers, wherein the RRC message informs the wireless communication device released one or more CPAC configurations associated with the one or more invalid CPAC containers, wherein prior to the wireless communication node receiving the RCC, the wireless communication device: determines an existence of valid CPAC containers, and restarts, responsive to determining the existence of the valid CPAC containers, an evaluation of one or more CPAC execution conditions.

In some embodiments, the RRC messages causes the wireless communication node to transfer a second message to a secondary wireless communication node (SN) via X2/Xn signaling, to inform the SN to release a CPAC configuration associated with the CPAC container.

In some embodiments, the second message includes an information element that includes at least one of a release indicator, a release indicator and associated released cell information, a released cell information, wherein the released cell information includes at least one of a PSCell frequency and a physical cell identifier (PCI), a candidate cell identifier, a conditional reconfiguration index, and a global cell identifier (CGI).

In some embodiments, the method includes receiving, by the wireless communication node, the RRC message via a signaling radio bearer (SRB) type corresponding to SRB3.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 7 illustrates a flow diagram of an example environment for PCell CHO with PSCell addition, in accordance with some embodiments of the present disclosure.

FIG. 9 illustrates a flow diagram of an example environment for PCell CHO with cascaded conditional PSCell addition/activation, in accordance with some embodiments of the present disclosure.

FIG. 11 illustrates a flow diagram of an example environment for PCell CHO with cascaded conditional PSCell addition/activation, in accordance with some embodiments of the present disclosure.

FIG. 12A is a flow diagram depicting a method for improving mobility performance from the perspective of a master node, in accordance with some embodiments of the present disclosure.

FIG. 12B is a flow diagram depicting a method for improving mobility performance from the perspective of a master node, in accordance with some embodiments of the present disclosure.

FIG. 12C is a flow diagram depicting a method for improving mobility performance from the perspective of a wireless communication device, in accordance with some embodiments of the present disclosure.

DETAILED DESCRIPTION

Figure 1:
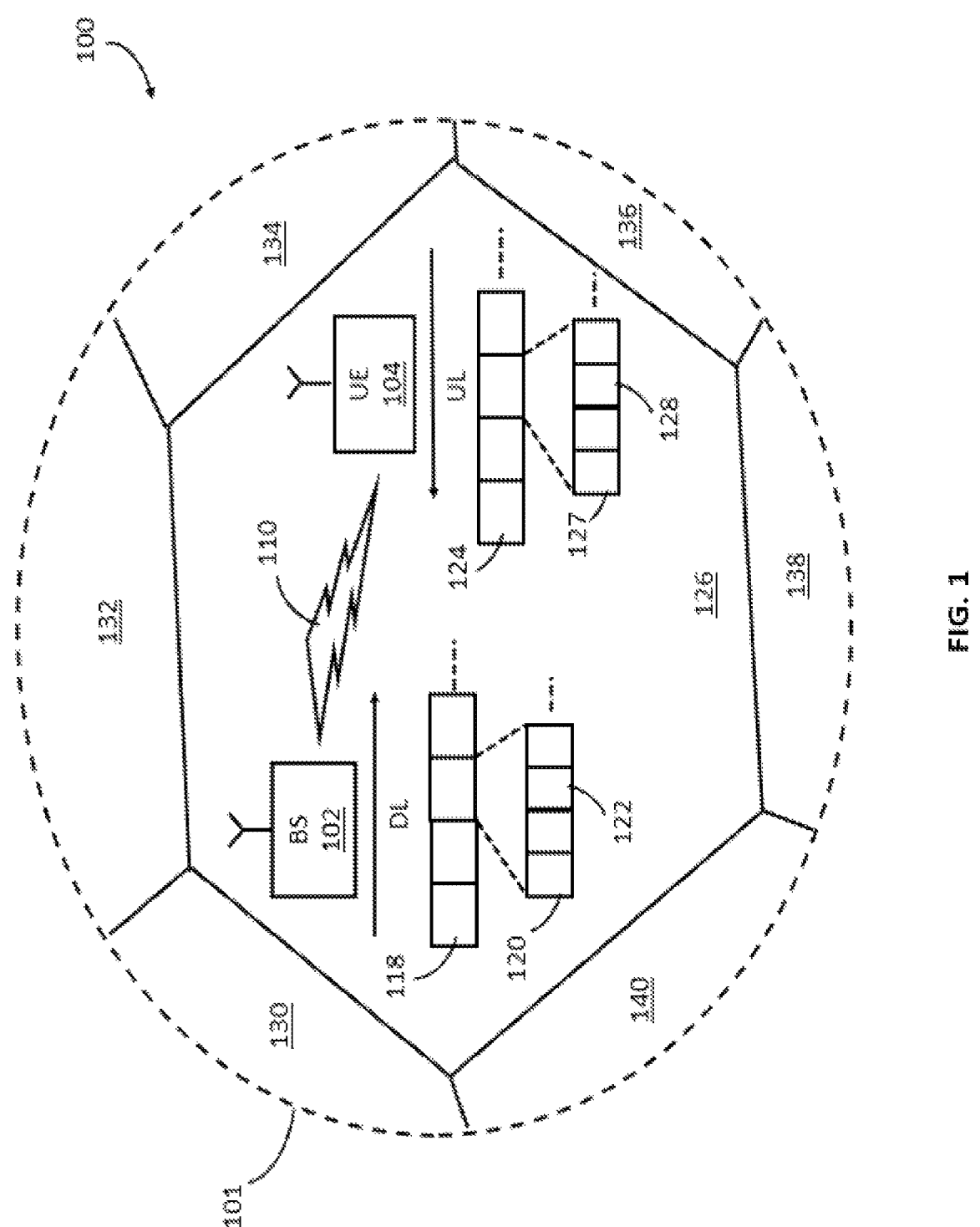
FIG. 1 illustrates an example wireless communication network, and/or system, 100 in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

3GPP 3rd Generation Partnership Project
5G 5th Generation Mobile Networks
5G-AN 5G Access Network
5G gNB Next Generation NodeB
C-RNTI Cell Radio Network Temporary Identifier
CE Control Element
CG Configured Grant
CGI Cell Global Identity
CHO Conditional Handover
CPAC Conditional Primary Secondary Cell Addition or Change
CU Central Unit
DCI Downlink Control Information
DG Dynamic Grant
DL Down Link or Downlink DU Distributed Unit
eMBB Enhanced Mobile Broadband
eNB Evolved Node B
ETSI European Telecommunications Standards Institute
LTE Long Term Evolution
MAC Medium Access Control
MSC Mobile Switching Center
NAS Non-Access Stratum
NR Next Generation RAN
OFDM Orthogonal Frequency-Division Multiplexing
OFDMA Orthogonal Frequency-Division Multiple Access
OSI Open Systems Interconnection
PCell Primary Cell
PCI Physical Cell Identifier
PSCell Primary Secondary Cell
PDCP Packet Data Convergence Protocol
RAN Radio Access Network
RLC Radio Link Control
RRC Radio Resource Control
SDAP Service Data Adaptation Protocol
UE User Equipment
UL Up Link or Uplink Mobility performance is one of the most important performance metrics for long term evolution (LTE) and 5th Generation (5G) new radio (NR). In addition to traditional voice and internet data service, lots of innovative services appear with various quality of service (QoS) requirements in recent years. For example, modern services such as remote control, aerial, industrial automation, industrial control, Augmented Reality (AR) and Virtual Reality (VR) require ultra-reliability and low latency. That is, the mobility performance for such services should be guaranteed with very high reliability (robust) and very low interruption time. For example, a latency target of the interruption time during handover should be as small as possible (e.g., close to 0 ms or 0 ms). Thus, a mechanism is needed for improving the mobility performance to meet the requirements for minimal interruption and high reliability.

Accordingly, the systems and methods discussed herein provide a mechanism for improving the mobility performance to meet the requirements for minimal interruption and high reliability.

That is, as discussed in greater detail below, the present disclosure provides a mechanism for a 5G NR system to support the coexistence of a conditional handover (CHO) procedure and a conditional primary secondary cell addition or change (CPAC) procedure.

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101.

In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
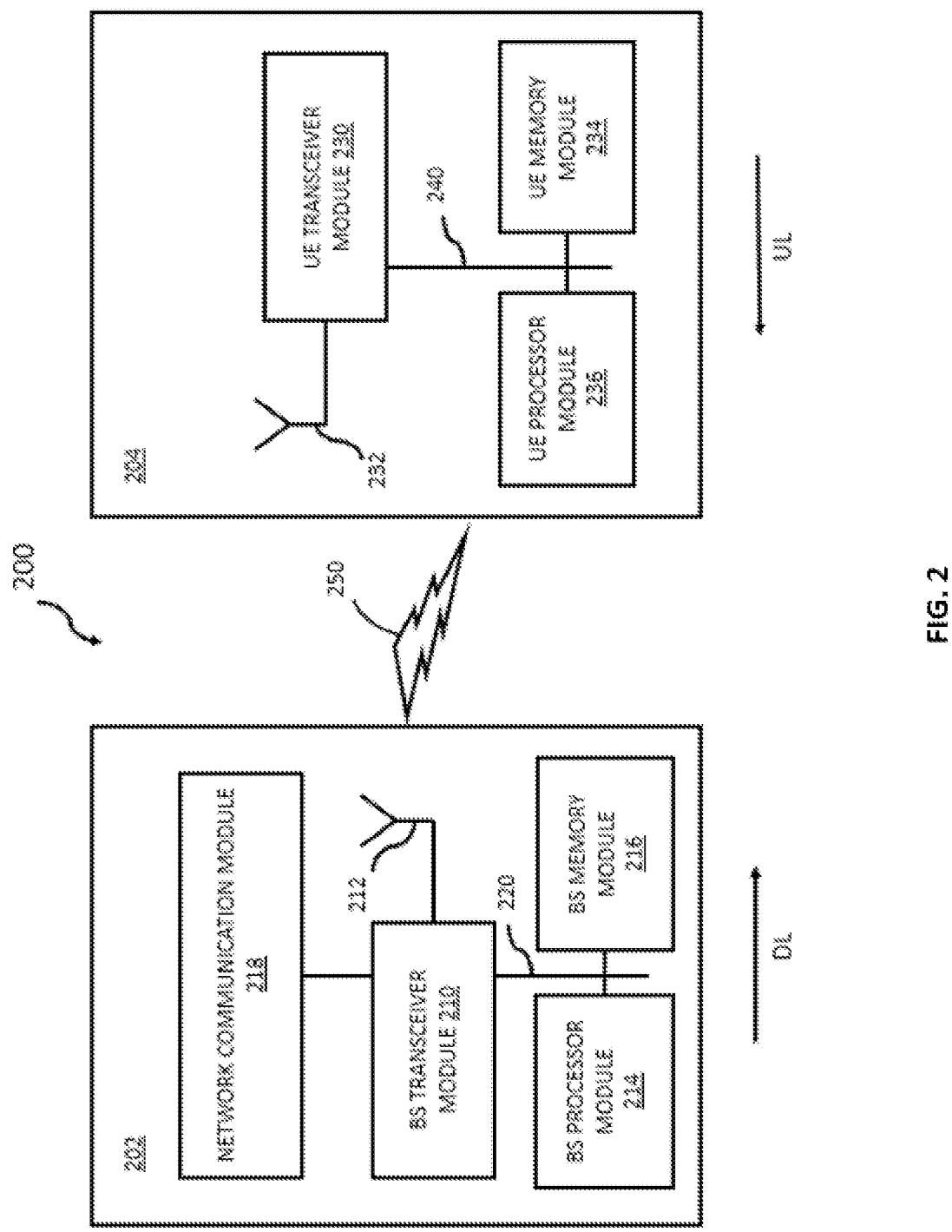
FIG. 2 illustrates a block diagram of an example wireless communication system 200 for transmitting and receiving wireless communication signals (e.g., OFDM/OFDMA signals) in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present disclosure. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Overview of the CHO/CPAC Procedures

A Conditional Handover (CHO) procedure may be used to improve mobility reliability (e.g., mobility robust) for a 5G NR system. The CHO procedure is defined as having a configured CHO execution condition that determines when/ whether the corresponding handover command is executed. Responsive to receiving the CHO configuration, UE starts to evaluate the condition and only executes the HO command once the condition is met.

Figure 3:
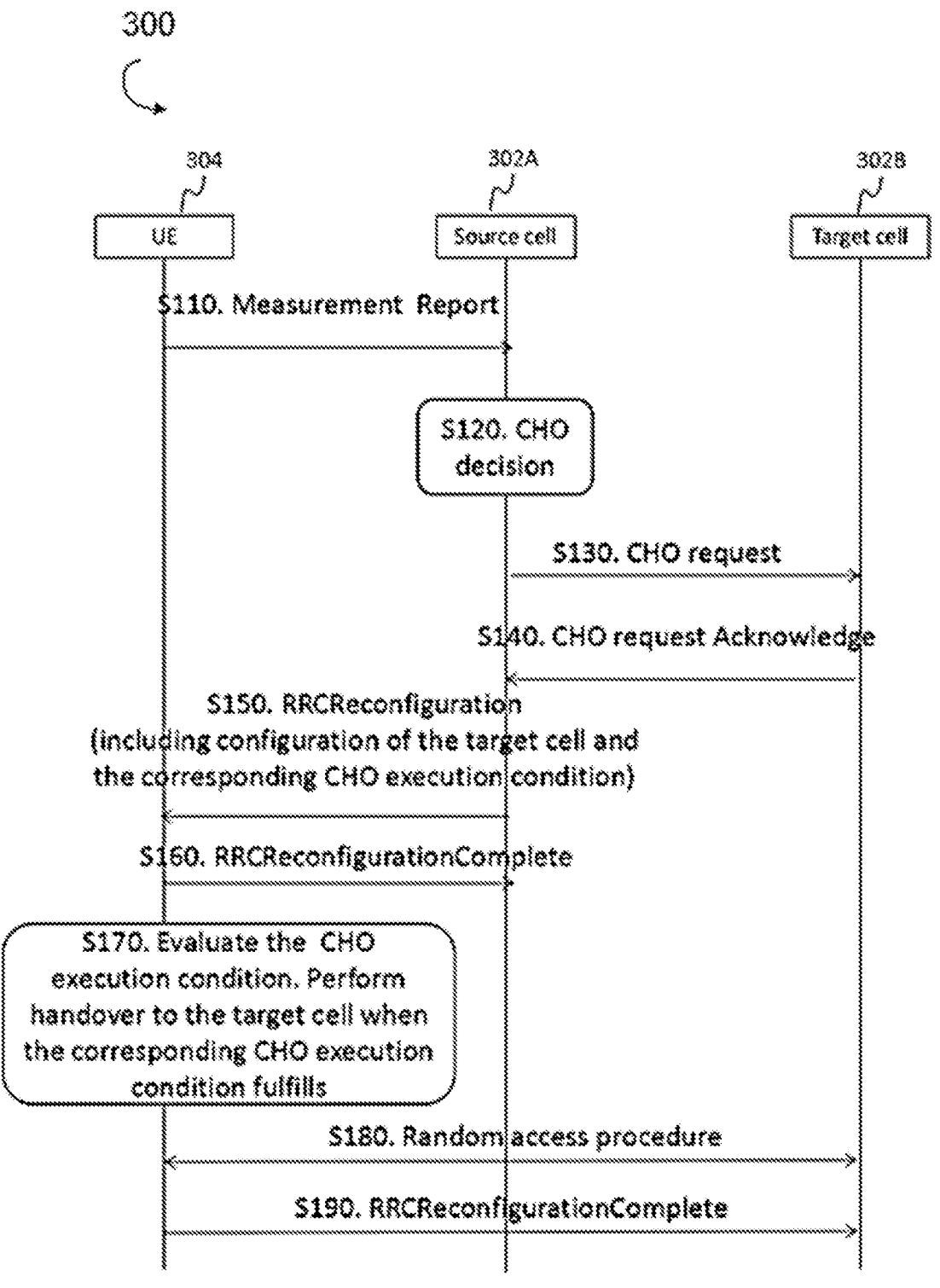
FIG. 3 illustrates a flow diagram of an example CHO procedure, in accordance with some embodiments of the present disclosure.

FIG. 3 illustrates a flow diagram of an example CHO procedure, in accordance with some embodiments of the present disclosure. The example environment 300 includes a UE 304 (e.g., UE 104 in FIG. 1), a source cell 302A (sometimes referred to as, "wireless communication node"), and/or a target cell 302B (sometimes referred to as, "wireless communication node"). In some embodiments, the source cell 302A may be a "first" wireless communication node having identical or similar functionality as the BS 102 in FIG. 1 and the target cell 302B may be a "second" wireless communication node having identical or similar functionality as the BS 102 in FIG. 1.

At operation S110, the UE 304 may send (e.g., transmit, deliver, etc.) a message (labeled in FIG. 3 as, "S110 Measurement Report) to the source cell 302A to report the measurement result of the target cell 302B. At operation S120, the source cell 302A makes a decision on the usage of CHO to handoff the UE based on the Measurement Report information or RRM information. At operation S130, the source cell 302A sends a CHO request (labeled in FIG. 3 as, "S130. CHO request") to the target cell 302B. At operation S140, the target cell 302B sends a message (labeled in FIG. 3 as, "CHO request Acknowledge") to the source cell 302A. At operation S150, the source cell 302A sends a message (labeled in FIG. 3. as, "RRCReconfiguration") to the UE 304, where the message includes a CHO configuration. In some embodiments, the CHO configuration may include the configuration of the target cell 302B and/or the corresponding CHO execution condition of the target cell 302B.

At operation S160, the UE 304 sends a message (labeled in FIG. 3 as, "RRCReconfigurationComplete") to the source cell 302A. At operation S170, the UE 304 maintains a connection with the source cell 302A after receiving the CHO configuration, and starts to evaluate the CHO execution condition for the target cell 302B. At operation S180, if the CHO execution condition is fulfilled (e.g., satisfied, met, achieved, etc.), then the UE 304 performs a handover to the target cell 302B and applies the corresponding configuration received at operation S150. At operation S180, the UE 304 accesses the target cell 302B. At operation S190, the UE 304 sends a message (labeled in FIG. 3 as, "RRCReconfigurationComplete") to the target cell 302B.

The UE 304 in the wireless network can operate in Dual Connectivity, including intra-E-UTRA DC or Multi-Radio DC (MR-DC). In case of intra-E-UTRA DC, both the MN (master node, such as BS 102 in FIG. 1) and SN (secondary node, such as BS 102 in FIG. 1) may provide E-UTRA access. While in case of MR-DC, one node provides NR access and the other one provides either E-UTRA or NR access. One or multiple serving cells can be configured both on MN and SN. Serving cells configured on MN are defined as a Master Cell Group (MCG) while serving cells configured on SN are defined as a Secondary Cell Group (SCG). In each cell group, there's one primary cell and the others are secondary cell. The primary cell in the MCG is denoted as PCell while the primary cell in the SCG is denoted as PSCell. When operating in DC, a Radio Bearer (RB) can be configured to utilize either the MCG resources (MCG bearer) or SCG resources (MCG bearer) or both MCG and SCG resources (split bearer).

Figure 4:
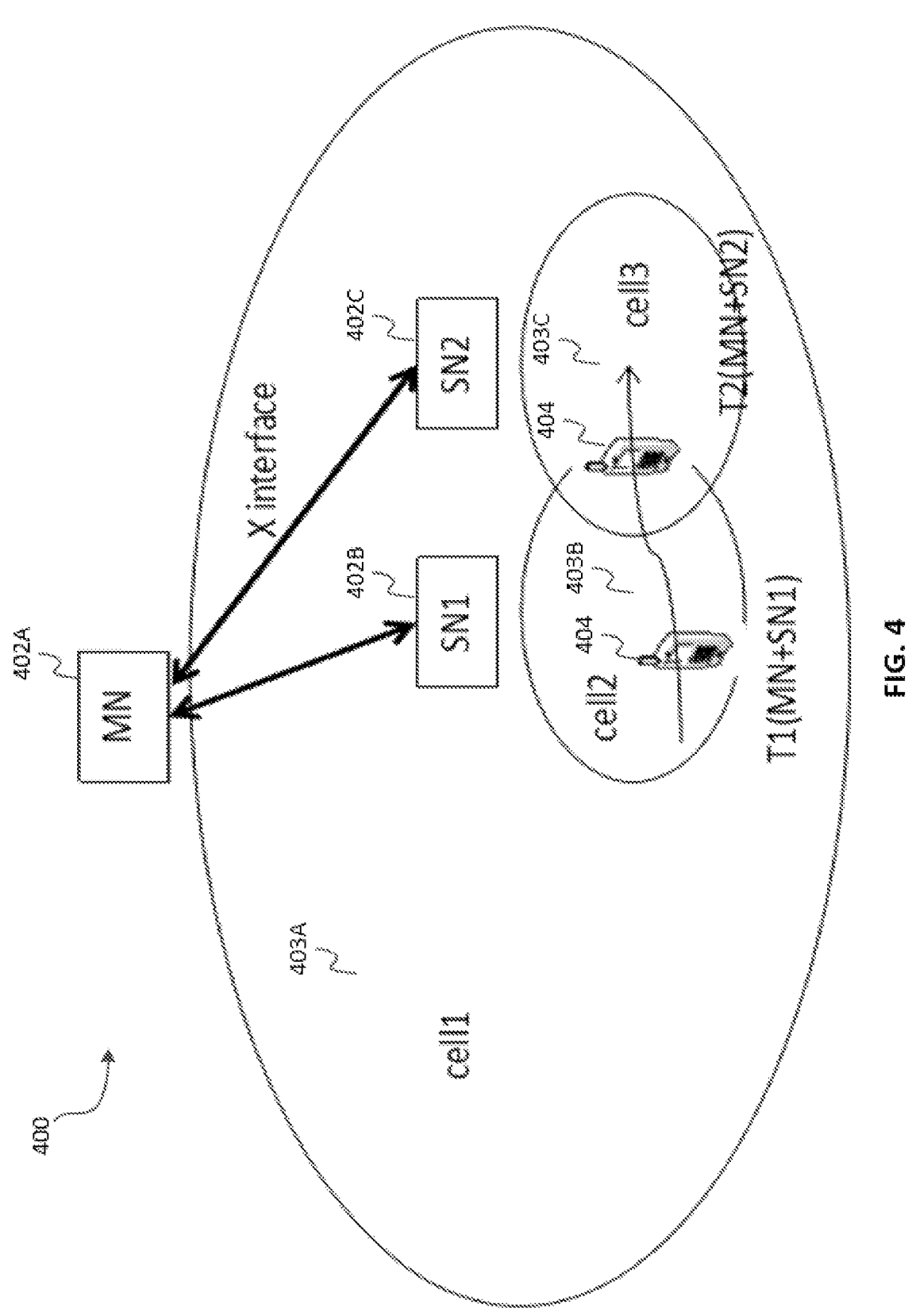
FIG. 4 illustrates a block diagram of an example 5G environment for a secondary node (SN) change, in accordance with some embodiments of the present disclosure.

FIG. 4 illustrates a block diagram of an example 5G environment for a secondary node (SN) change, in accordance with some embodiments of the present disclosure. The example environment 400 includes a UE 404, a master node 402A (shown in FIG. 4 as "MN"), a "first" secondary wireless communication node 402B (shown in FIG. 4 as "SN1"), and a "second" secondary wireless communication node 402C (shown in FIG. 4 as "SN2"). In some embodiments, any of the MN 402A, the SN 402B, and the SN 402C may be a BS 102 in FIG. 1.

Cell 403A (shown in FIG. 4 as, "cell1"), Cell 403B (shown in FIG. 4 as, "cell2"), and Cell 403C (shown in FIG. 4 as, "cell3") are the corresponding cells generated by MN 402A, SN 402B and SN 402C respectively. X interfaces may be deployed between MN 402A and SN 402B, and SN 402C respectively. At time T1, the UE 404 is operating in DC between MN 402A and SN 402B. With the movement of the UE 404, at time T2, the SN is changed from SN 402B to SN 402C. The SN change can be initiated either by the MN 402A or the source SN.

To improve mobility reliability (i.e., mobility robust) in case of SN change or SN addition, a Conditional PSCell Addition and PSCell Change (CPAC) may also be promoted. Similar to CHO, CPAC is defined as having a configured CPAC execution condition that determines when and/or whether the corresponding PSCell addition/change command is executed. Responsive to receiving the CPAC configuration, the UE 404, in some embodiments, starts to evaluate the condition and only executes the CPAC command once the condition is met.

Figure 5:
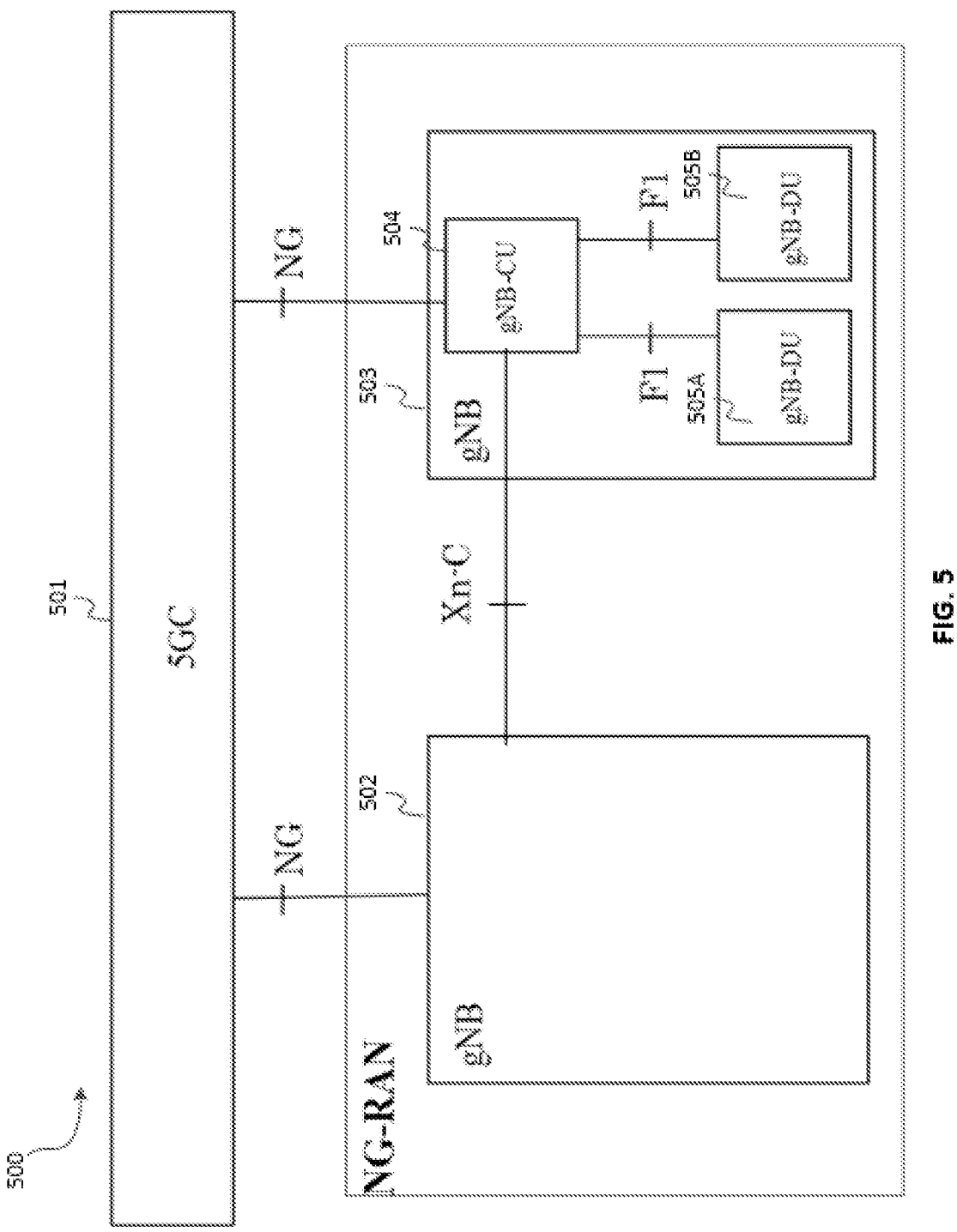
FIG. 5 illustrates a block diagram of an example wireless communication node configured for a central unit (CU)/ distributed unit (DU) split structure, in accordance with some embodiments of the present disclosure.

In case of CHO/CPAC, a node (e.g., a target node) can be a CU/DU split structure. For example, FIG. 5 illustrates a block diagram of an example environment of a 5GC system supporting a wireless communication node having a central unit (CU)/distributed unit (DU) split architecture, in accordance with some embodiments of the present disclosure. In case of CHO/CPAC, a target node can be a CU/DU split structure. The environment 550 includes a 5GC system 501 that is coupled to a gNB 503 (e.g., a target node). The gNB 503 includes of a gNB Central Unit (gNB-CU) 504 and one or more gNB Distributed Units (gNB-DU) 505A, 505B (collectively referred to as, "gNB-DU 505"). The gNB-CU 504 and a gNB-DU 505 are connected via an F1 interface. The gNB-CU 504 may be defined as a logical node hosting RRC, SDAP and PDCP protocols of the gNB 503 or RRC and PDCP protocols of the en-gNB that controls the operation of one or more gNB-DUs 505. The gNB-DU 505 may be defined as a logical node hosting RLC, MAC and PHY layers of the gNB 503 (sometimes referred to as, "en-gNB"), and its operation may be partly controlled by gNB-CU 504. One gNB-DU 505 may support one or multiple cells. One cell may be supported by only one gNB-DU 505.

In case of CHO/CPAC, multiple candidate SpCells (e.g., PCell and/or PSCell) can be resided in one target node. For example, multiple candidate SpCells may belong to one gNB-CU, but links (e.g., connect, associate, attach, etc.) to one or more gNB-DUs 505. Responsive to triggering the execution of CHO/CPAC, the UE (e.g., UE 104 in FIG. 1) may perform a random access procedure (RAP) to the selected (e.g., target cell) SpCell resided in the target gNB-DU 505 and/or send (e.g., transmit, deliver, etc.) the RRCReconfigurationComplete message to the target SpCell if there is a Signal Radio Bearer (SRB) located in the target node (e.g., SRB1, SRB3, etc.), as shown in operations S180 and S190 in FIG. 3. The target gNB-DU 505 may send the UL RRC MESSAGE TRANSFER to transfer the RRCReconfigurationComplete message (if any) to the gNB-CU 504 over the F1 interface.

3. Coexistence of the CHO/CPAC Procedures

Considering that the CHO is related to mobility robustness and the CPAC is related to reducing latency of DC setup, there may be some benefits to support CHO and CPAC simultaneously. From a UE perspective, both CHO and CPAC configuration are the RRCReconfiguration message encapsulated in a CHO/CPAC container with execution conditions. Thus, a mechanism is needed for the UE apply the corresponding configuration (e.g., RRCReconfiguration) stored in the container upon meeting the execution condition of the cell regardless of CHO or CPAC.

3.1 Configuration of CHO and CPAC

The present disclosure describes a procedure for the target MN, in some embodiments, to inform the target SN about the type/purpose of the SN addition procedure (e.g., CPAC, or normal PSCell addition/change for CHO). In response, the target SN may, in some embodiments, send the PSCell identification information to the target MN, which may cause the target MN to transfer the PSCell identification information to the source MN, if needed. The present disclosure also describes a procedure for the MN to inform the SN about CHO and request the SN to maintain the data transmission with the UE and keep the UE context.

3.1.1. How to Inform a Target SN about the Type and/or Purpose of a SN Addition Procedure A target MN may inform the target SN as follows:

The source MN, in some embodiments (sometimes referred to as, "Step 1"), may send a Handover Request (may include the CHO indication) to the target MN.

The target MN, in some embodiments (sometimes referred to as, "Step 2"), may send an indication to the target SN via X2/Xn signaling to inform the target SN about the type/purpose of the SN addition procedure (e.g., CPAC, or normal PSCell addition/change for CHO). The indication may be transferred to the SN by one of the following options:

In some embodiments (sometimes referred to as, "option 1"), the target MN may include the indicator (e.g., "PSCell addition/change for CHO", or "CPAC indication") directly in the SN(SgNB) Addition Request or SN(SgNB) Modification Request message. That is, the target MN includes the indicator as one information element in the SN(SgNB) Addition Request or SN(SgNB) Modification Request message.

In some embodiments, (sometimes referred to as, "option 2"), the target MN includes the indicator (e.g., "PSCell addition/change for CHO", or "CPAC indication") as the "Cause" value which may be added in the SN(SgNB) Addition Request or SN(SgNB) Modification Request message. For example, the target MN may set (e.g., initialize, configure, adjust, modify, etc.) the "Cause" value as "PSCell addition/change for CHO" or "CPAC".

In some embodiments, (sometimes referred to as, "option 3"), the target MN may include the indicator (e.g., "PSCell addition/change for CHO" or "CPAC indication") in a RRC message (e.g., CG-ConfigInfo message). The RRC message may be included as one information element in the SN(SgNB) Addition Request or SN(SgNB) Modification Request message.

The target SN, in some embodiments (sometimes referred to as, "Step 3"), responds with the indication of one or more configured PSCell identification information (e.g., PSCell frequency+PCI; Cell ID; CGI) to the target MN via X2/Xn signaling. The indication may be transferred to the MN by one of the following options:

In some embodiments, (sometimes referred to as, "option 1"), the target SN may include the indicator (e.g. PSCell frequency+PCI; Cell ID; CGI) directly in the SN Addition Request Acknowledge/SgNB Addition Request Acknowledge message. That is, the target SN includes the indicator as one information element in the SN(SgNB) Addition Request Acknowledge or SN(SgNB) Modification Request Acknowledge message.

In some embodiments, (sometimes referred to as, "option 2"), the target SN includes the indicator (e.g., PSCell frequency+PCI; Cell ID; CGI) in a RRC message (e.g., CG-Config message). The RRC message may be included as one information element in the SN(SgNB) Addition Request Acknowledge or SN(SgNB) Modification Request Acknowledge message.

The target MN, in some embodiments (sometimes referred to as, "Step 4"), responds with a Handover Request Acknowledge to the source MN including an indication of the configured PSCell identification information (e.g., PSCell frequency+PCI; Cell ID; CGI).

In some embodiments, the indication may be transferred to the source MN by including the indicator (e.g., PSCell frequency+PCI; Cell ID; CGI) directly in the Handover Request Acknowledge message. That is, the target MN may include the indicator as one information element in the Handover Request Acknowledge message.

In some embodiments, the indication may be transferred to the source MN by including the indicator (e.g., PSCell frequency+PCI; Cell ID; CGI) in a RRC message (e.g., a HandoverCommand message). The RRC message may be included as one information element in the Handover Request Acknowledge message.

3.1.2. How to Inform a SN about CHO/HO

A MN (master node) may inform a SN (secondary node) about CHO, request the SN to maintain the data transmission with the UE, and/or keep the UE context, and/or request the SN not to modify/change the SN configuration as follows:

The MN, in some embodiments (sometimes referred to as, "Step 1"), may send an indication of CHO or early data forwarding to the SN via X2/Xn signaling.

In some embodiments (sometimes referred to as, "option 1"), the indication can be transferred to the SN by including the indicator (e.g., "CHO indication", "SN mobility for CHO", "early data forwarding") directly in the SN(SgNB) Release Request message. That is, the MN may include the indicator as one information element in the SN(SgNB) Release Request message.

In some embodiments (sometimes referred to as, "option 2"), the MN may include the indicator (e.g., "CHO indication", "SN mobility for CHO", "early data forwarding") as the "Cause" value which is included in the SN(SgNB) Release Request message. For example, the MN may set the "Cause" value as "CHO indication", "SN mobility for CHO" or "early data forwarding".

In some embodiments (sometimes referred to as, "option 3"), the MN include the indicator (e.g., "CHO indication", "SN mobility for CHO", "early data forwarding") in a RRC message, e.g. CG-ConfigInfo message. The RRC message may be included as one information element in the SN(SgNB) Release Request message.

The SN, in some embodiments (sometimes referred to as, "Step 2"), may maintain the data transmission with the UE, keep the UE context and/or, if applicable, start data forwarding. In some embodiments, the SN may response with an SN(SgNB) Release Request Acknowledge message to the MN.

If the SN wants to configure SN change/modification procedure (e.g., CPAC, legacy SN modification/change procedure), then the SN may send an indication to request the MN even in case the procedure is not involved with the MN. The SN request indication may be transferred to the source MN by one of the following options:

In some embodiments (sometimes referred to as, "option 1"), the SN may include the indicator (e.g., "SN modification request") directly in the SN(SgNB) Modification Required or SN(SgNB) Change required message. That is, include the indicator as one information element in the SN Modification Required or SN Change required message.

In some embodiments (sometimes referred to as, "option 2"), the SN may include the indicator (e.g., "SN modification request") as the "Cause" value which is included in the SN(SgNB) Modification Required or SN(SgNB) Change required message (e.g., set the "Cause" value as "SN modification request").

In some embodiments (sometimes referred to as, "option 3"), the SN may include the indicator (e.g., "SN modification request") in a RRC message (e.g., CG-Config message). The RRC message may be included as one information element in the SN(SgNB) Modification Required or SN(SgNB) Change required message. If the MN allows the SN change/modification request, then the MN may update the CHO configuration for the candidate cell whose CHO container including SCG configuration, based on the new SCG configuration.

A MN (master node) may inform a SN (secondary node) about a normal HO upon configuring the normal HO (e.g., during the handover preparation phase) or upon successful execution of normal HO (e.g., receiving a RRCReconfigurationComplete message from the UE) regardless of whether the HO procedure is involved with the SN or not, then the SN can decide whether to release the configured conditional PSCell addition or change (CPAC) configuration or/and generate the RRC message to explicitly release the CPAC configuration stored in the UE as follows:

The MN, in some embodiments (sometimes referred to as, "Step 1"), may send an indication of HO to the SN via X2/Xn signaling.

In some embodiments (sometimes referred to as, "option 1"), the indication can be transferred to the SN by including the indicator (e.g., "HO indication", "HO without SN involved", "Release CPAC indication") directly in the SN(SgNB) Modification Request message. That is, the MN may include the indicator as one information element in the SN(SgNB) Modification Request message.

In some embodiments (sometimes referred to as, "option 2"), the MN may include the indicator (e.g., "HO indication", "HO without SN involved", "Release CPAC indication") as the "Cause" value which is included in the SN(SgNB) Modification message. For example, the MN may set the "Cause" value as "HO indication", "HO without SN involved", "Release CPAC indication".

In some embodiments (sometimes referred to as, "option 3"), the MN include the indicator (e.g., "HO indication", "HO without SN involved", "Release CPAC indication") in a RRC message, e.g. CG-ConfigInfo message. The RRC message may be included as one information element in the SN(SgNB) Modification Request message.

The SN, in some embodiments (sometimes referred to as, "Step 2"), may delete the pre-configured CPAC configuration, or/and generate a RRC message (e.g. RRCReconfiguration message) to explicitly release the CPAC configuration stored in the UE. In some embodiments, the SN may response with an SN(SgNB) Modification Request Acknowledge message to the MN. In some embodiments, the SN(SgNB) Modification Request Acknowledge message including an RRC container (e.g. CG-Config message) containing the generated RRC message.

The SN, in some embodiments (sometimes referred to as, "Step 3"), send a RRC message (e.g., RRCReconfiguration message) to the UE to explicitly release the CPAC configuration stored in the UE.

3.1.3. Example Embodiment(s): PCell CHO with/without PSCell Change

Figure 6:
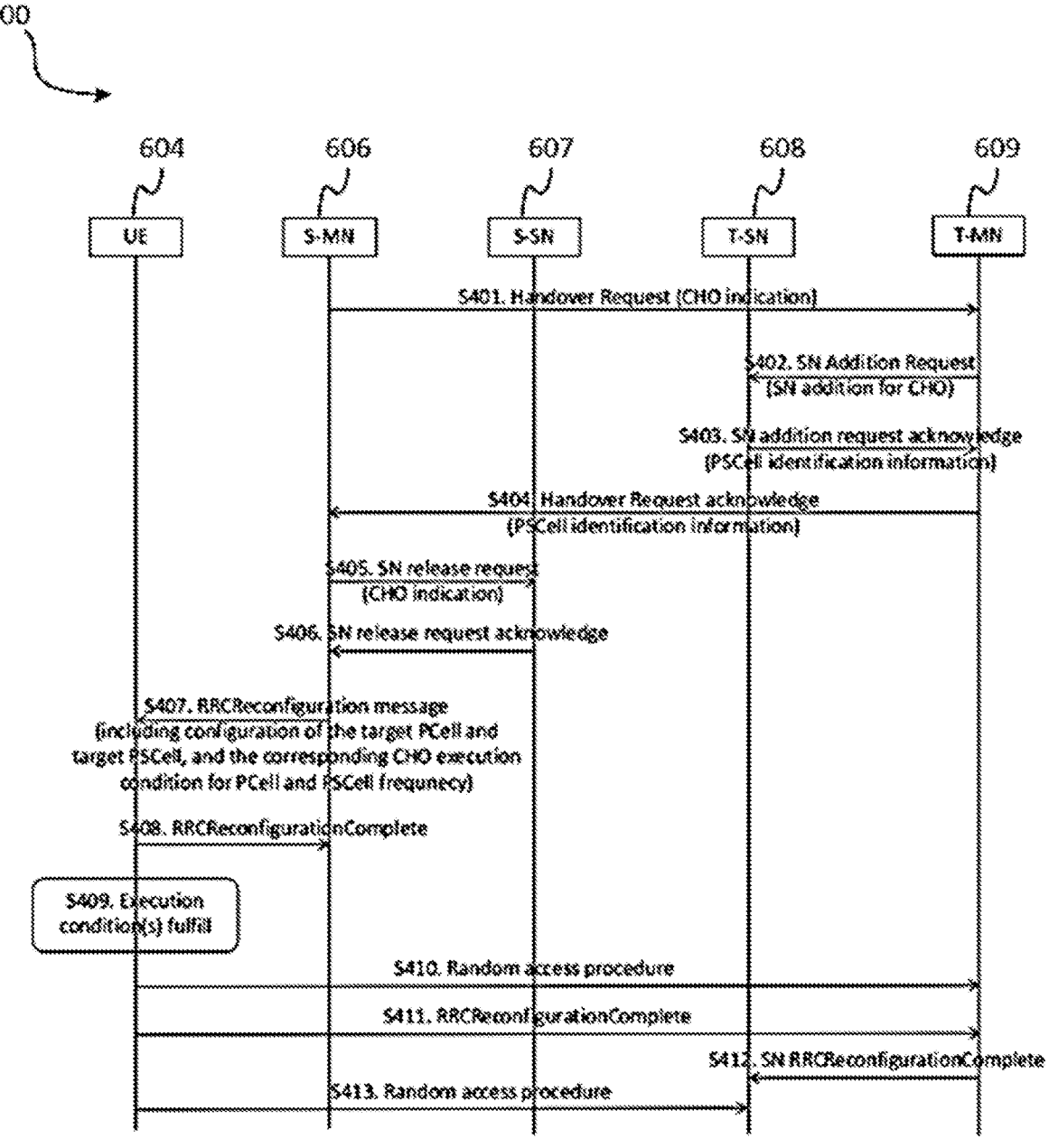
FIG. 6 illustrates a flow diagram of an example environment for PCell CHO with/without PSCell change, in accordance with some embodiments of the present disclosure.

FIG. 6 illustrates a flow diagram of an example environment for PCell CHO with/without PSCell change, in accordance with some embodiments of the present disclosure. The example environment 600 includes a UE 604 (e.g., UE 104 in FIG. 1), a source master node 606 (shown in FIG. 6 as, "S-MN"), a source secondary node 607 ("shown in FIG. 6 as, "S-SN"), a target secondary node 608 (shown in FIG. 6 as, "T-SN"), and a target master node 609 (shown in FIG. 6 as, T-MN"). In some embodiments, the S-MN 606, the S-SN 607, T-SN 608, the T-MN 609 may each be a wireless communication node having identical or similar functionality as the BS 102 in FIG. 1. Although FIG. 6 illustrates only one single target MN (e.g., T-MN 609) and one single target SN (e.g., T-SN 607), one of ordinary skill in the art could recognize that multiple target nodes could be considered during the procedure. For the PCell CHO without SN change, the S-SN 607 and T-SN 608 may be the same node.

At operation S401, the source MN 606 may send a HO Request including a CHO indication to the target MN 609.

At operation S402, if the target MN 609 allows CHO and decides to change the SN, then the target MN 609 may send SN Addition Request to the target SN 608 including an indicator to indicate the SN addition procedure is used for CHO, in order to avoid that the (target) SN prematurely releases the UE context before reception SN RRC Reconfiguration Complete from the target MN 609.

At operation S404, the (target) SN may responds with an SN Addition Request Acknowledge including the configured PSCell identification information (e.g., PSCell frequency+ PCI; Cell ID; CGI).

At operation S404, the target MN 609 may send a Handover Request Acknowledge including the configured PSCell identification information (e.g., PSCell frequency+ PCI; Cell ID; CGI) to the source MN.

At operation S405, the source MN 606 may send a SN Release Request to the source SN 607 including a CHO indication to inform that CHO is configured.

At operation S406, the source SN 606 may send a SN release request acknowledge to the source MN 606. The source SN 607 may maintain the data transmission with the UE 604, keep the UE context and/or, if applicable, starts data forwarding.

At operation S407, the source MN 606 may send an RRCReconfiguration message with CHO configuration to the UE 604. The CHO configuration may include the configuration of the target cell (including both PCell and PSCell configuration) and the corresponding CHO execution condition of the target cell on the target PCell and PSCell frequency. The triggering conditions can be A4/A5 event or an individual threshold for the target PCell and PSCell frequency.

At operation S408, the UE 604 may send an RRCReconfigurationComplete to the source MN 606.

At operation S409, the UE 604 may maintain a connection with source MN 606 and source SN 607 after receiving CHO configuration, and/or start to evaluate the CHO execution condition for the target cell. If the CHO execution condition (for both PCell and PSCell) is fulfilled, the UE 604 may apply the corresponding configuration received at operation S407 and/or trigger a handover to the target cell.

At operations S410 and S411, the UE 604 may access the target MN 609 and/or reply with an RRCReconfigurationComplete message.

At operation S412, the target MN 609 may transfer the SN RRCReconfigurationComplete message to the target SN 608.

At operation S414, the UE 604 may access to the target SN 608.

3.1.4. Example Embodiment(s): PCell CHO with PSCell Addition

FIG. 7 illustrates a flow diagram of an example environment for PCell CHO with PSCell addition, in accordance with some embodiments of the present disclosure. The example environment 700 includes a UE 704 (e.g., UE 104 in FIG. 1), a source master node 706 (shown in FIG. 7 as, "S-MN"), a target secondary node 708 (shown in FIG. 7 as, "T-SN"), and a target master node 709 (shown n FIG. 7 as, T-MN"). In some embodiments, the S-MN 706, T-SN 708, the T-MN 709 may each be a wireless communication node having identical or similar functionality as the BS 102 in FIG. 1. Although FIG. 7 illustrates only one single target MN (e.g., T-MN 709) and one single target SN (e.g., T-SN 707), one of ordinary skill in the art could recognize that multiple target nodes could be considered during the procedure.

Operations S501 through operation S504 may, in some embodiments, be the same as operations S401 through S404 in FIG. 6.

An example signaling structure of the RRCReconfiguration message that is transferred in operations S407/S505 may be as follows:

The RRCReconfiguration message includes the conditionalReconfiguration for CHO+CPAC and some other reconfiguration generated by the source MN (without reconfigurationWithSync). The conditionalReconfiguration contains the index, execution conditions for the target PCell and PSCell frequency, and the conditionalReconfiguration container containing the RRCReconfiguration generated by the target MN, which includes both MCG (with reconfigurationWithSync) and SCG configuration. The SCG configuration generated by the target SN is encapsulated in the nr-SCG, which is included in the MRDC-SecondaryCellGroupConfig.

---

RRCReconfiguration message

---

```
->other reconfiguration generated by the MN (without reconfigurationWithSync)
->conditionalReconfiguration
   -->conditionalReconfiguration index
   -->execution condition configuration for target PCell frequency and PSCell frequency
   -->conditionalReconfiguration container
```

-continued

| RRCReconfiguration message |
| --- |
| ---> RRCReconfiguration message generated by target MN<br>    ----> MRDC-SecondaryCellGroupConfig<br>       ----->nr-SCG (CONTAINING RRCReconfiguration generated by target SN) |

3.1.5. Example Embodiment(s): PCell CHO with Cascaded Conditional PSCell Change (CPC)

Figure 8:
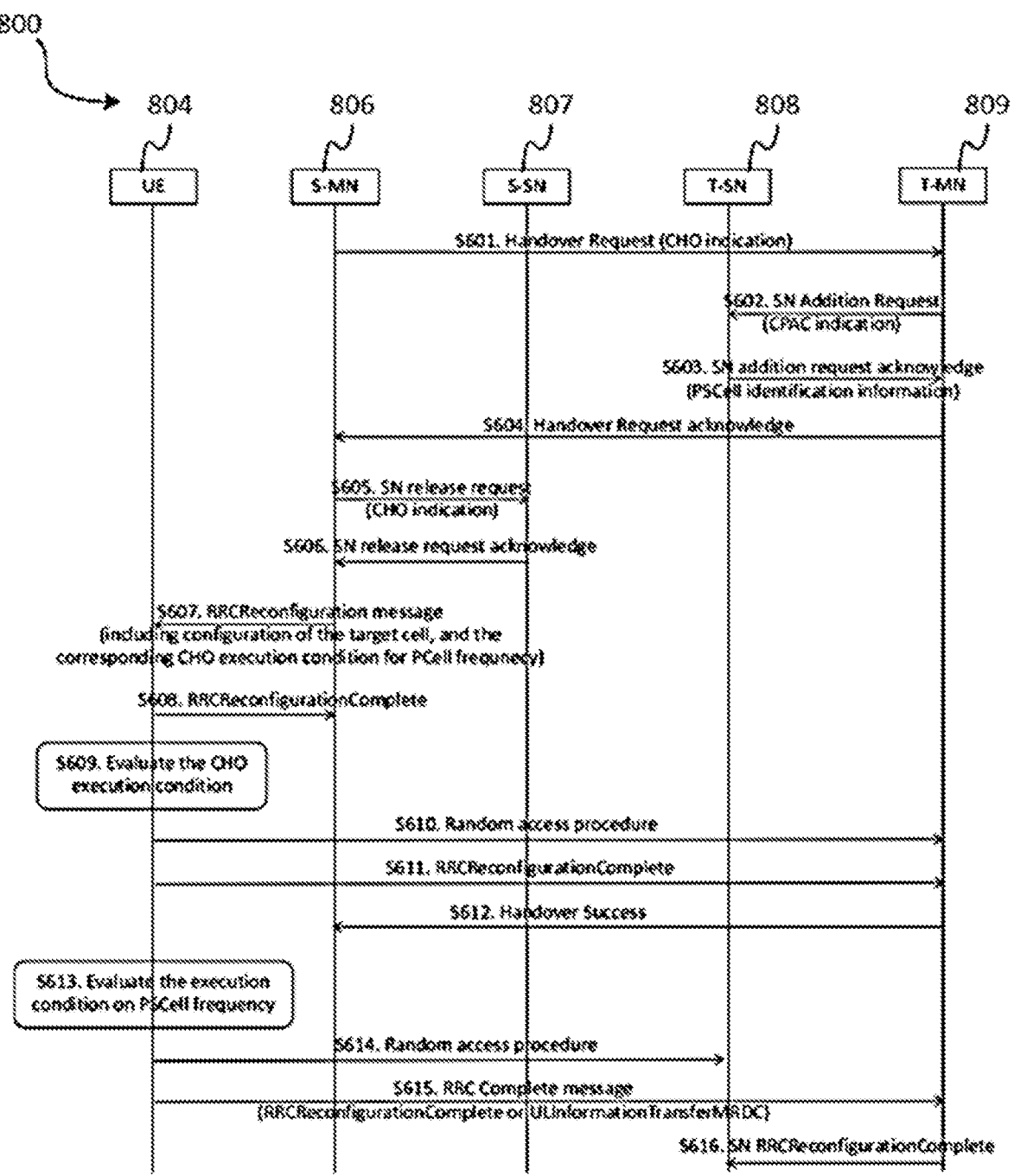
FIG. 8 illustrates a flow diagram of an example environment for PCell CHO with cascaded conditional PSCell change (CPC), in accordance with some embodiments of the present disclosure.

FIG. 8 illustrates a flow diagram of an example environment for PCell CHO with cascaded conditional PSCell change (CPC), in accordance with some embodiments of the present disclosure. The example environment 800 includes a UE 804 (e.g., UE 104 in FIG. 1), a source master node 806 (shown in FIG. 8 as, "S-MN"), a source secondary node 807 ("shown in FIG. 8 as, "S-SN"), a target secondary node 808 (shown in FIG. 8 as, "T-SN"), and a target master node 809 (shown in FIG. 8 as, T-MN"). In some embodiments, the S-MN 806, the S-SN 807, T-SN 808, the T-MN 809 may each be a wireless communication node having identical or similar functionality as the BS 102 in FIG. 1. Although FIG. 8 illustrates only one single target MN (e.g., T-MN 809) and one single target SN (e.g., T-SN 807), one of ordinary skill in the art could recognize that multiple target nodes could be considered during the procedure. For the PCell CHO without SN change, S-SN 807 and T-SN 808 may be the same node.

At operation S601, the source MN 806 sends a HO Request including a CHO indication to the target MN 809.

At operation S602, if the target MN 809 allows CHO and decides to configure a cascaded CPC, then the target MN 809 may send an SN Addition Request to the target SN including an indicator of CPAC.

At operation S603, the (target) SN may responds with an SN Addition Request Acknowledge including one or more candidate PSCell identification information (e.g., PSCell frequency+PCI; Cell ID; CGI).

At operation S604, the target MN 809 may send a Handover Request Acknowledge including cascaded CPC configuration (i.e., including the configuration of the target PSCell and the corresponding CPC execution condition for target PSCell frequency) to the source MN 806.

At operation S605, the source MN 806 may send an SN Release Request to the source SN 807 including a CHO indication to inform that CHO is configured.

At operation S606, the source SN 807 may send an SN release request acknowledge to the source MN 806. The source SN 806 may maintain the data transmission with the UE 804, keep the UE context and/or, if applicable, starts data forwarding.

At operation S607, the source MN 806 may send an RRCReconfiguration message with CHO configuration to the UE 804. The CHO configuration may include the configuration of the target cell and the corresponding CHO execution condition of the target cell on the target PCell frequency.

At operation S608, the UE 804 may send an RRCReconfigurationComplete to the source MN 806.

At operation S609, the UE 804 may maintain connection with the source MN 806 and the source SN 807 after receiving CHO configuration, and/or start to evaluate the CHO execution condition for the target cell. If the CHO execution condition is fulfilled, the UE 804 may apply the corresponding configuration received at operation S607 and/or trigger a handover to the target cell.

At operations S610/S611, the UE 804 may access the target MN and replies with RRCReconfigurationComplete message.

At operation S612, the target MN 809 may send a Handover Success message to the source MN 806. The source MN 806 can inform the source SN 807 and/or other candidate target MN 809 to release the reserved UE resource.

At operation S613/S614, the UE 804 may start to evaluate the CHO execution condition for the target PSCell. If the CPC execution condition is fulfilled, then the UE 804 may apply the corresponding configuration received at operation S607 and/or trigger a random access to the target PSCell.

At operation S615, the UE 804 may send an RRC complete message (e.g., RRCReconfigurationComplete or ULInformationTransferMRDC) to the (target) MN including an embedded SN RRCReconfigurationComplete message.

At operation S616, the (target) MN may transfer the SN RRCReconfigurationComplete message to the target SN 808.

3.1.6. Example Embodiment(s): PCell CHO with Conditional PSCell Addition/Activation (CPA)

FIG. 9 illustrates a flow diagram of an example environment for PCell CHO with cascaded conditional PSCell addition/activation, in accordance with some embodiments of the present disclosure. The example environment 900 includes a UE 904 (e.g., UE 104 in FIG. 1), a source master node 906 (shown in FIG. 9 as, "S-MN"), a target secondary node 908 (shown in FIG. 9 as, "T-SN"), and a target master node 909 (shown n FIG. 9 as, T-MN"). In some embodiments, the S-MN 906, T-SN 908, the T-MN 909 may each be a wireless communication node having identical or similar functionality as the BS 102 in FIG. 1. Although FIG. 9 illustrates only one single target MN (e.g., T-MN 909) and one single target SN (e.g., T-SN 907), one of ordinary skill in the art could recognize that multiple target nodes could be considered during the procedure.

Operation S701 through operation S704 may, in some embodiments, be the same as operations S601 through S604 in FIG. 8.

Operation S705 through operation S714 may, in some embodiments, be the same as operations S607 through S616 in FIG. 8.

An example signaling structure of the RRCReconfiguration message transferred in S407/S505 may be as follows:

An example for signaling structure of the RRCReconfiguration message is shown in FIG. A. The RRCReconfiguration message includes the conditionalReconfiguration and some other reconfiguration generated by the source MN (without reconfigurationWithSync). The conditionalReconfiguration for CHO contains the index, execution conditions for the target PCell frequency, and the conditionalReconfiguration container containing the RRCReconfiguration generated by the target MN, which includes the target cell configuration (with reconfigurationWithSync) and the cascaded conditionalReconfiguration for CPAC. The cascaded conditionalReconfiguration for CPAC contains the index, execution conditions for the target PSCell frequency, and the conditionalReconfiguration container containing the RRCReconfiguration generated by the target MN, which includes SCG configuration and may include MCG configuration (without reconfigurationWithSync). The SCG configuration generated by the target SN is encapsulated in the nr-SCG, which is included in the MRDC-SecondaryCell-GroupConfig.

At operation S805, the source MN 1006 may send a SN Release Request to the source SN 1007.

At operation S806, the source SN 1007 may send an SN release request acknowledge to the source MN 1006. The source SN 1007 may stop providing user data to the UE 1004 if it does not receive the indication from the target MN 1009 to keep the UE context. If applicable, the source SN 1007 may start data forwarding.

At operation S807, the source MN 1006 may send an RRCReconfiguration message with a cascaded CPC configuration to the UE 1004. The CPC configuration may

```
                                    RRCReconfiguration message
->other reconfiguration generated by the MN (without reconfigurationWithSync)
->conditionalReconfiguration (for CHO)
  -->conditionalReconfiguration index
  -->execution condition configuration for the target PCell frequency
  -->conditionalReconfiguration container
     ---> RRCReconfiguration message generated by target MN
       ----> other reconfiguration generated by the MN (without reconfigurationWithSync)
       ----> conditionalReconfiguration (for CPAC)
         ----->conditionalReconfiguration index
         ----->execution condition configuration for the target PSCell frequency
         ----->conditionalReconfiguration container
            ------> RRCReconfiguration message generated by target MN
              ------> MRDC-SecondaryCellGroupConfig
                ------->nr-SCG (CONTAINING RRCReconfiguration generated by target SN)
```

3.1.7. Example Embodiment(s): Legacy HO with Cascaded Conditional PSCell Change (CPC)

Figure 10:
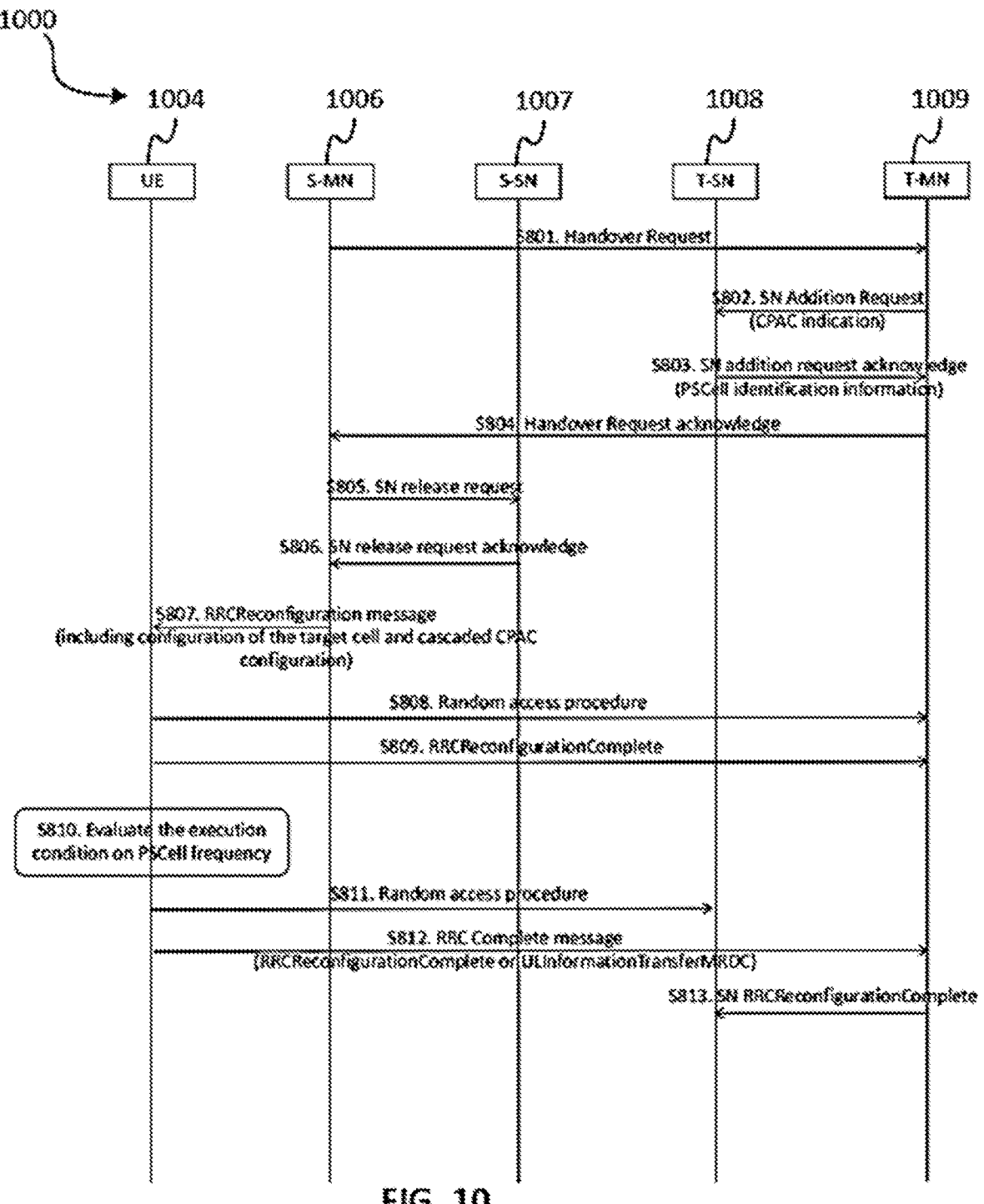
FIG. 10 illustrates a flow diagram of an example environment for legacy handover with cascade conditional PSCell change (CPC), in accordance with some embodiments of the present disclosure.

FIG. 10 illustrates a flow diagram of an example environment for legacy handover with cascade conditional PSCell change (CPC), in accordance with some embodiments of the present disclosure. The example environment 1000 includes a UE 1004 (e.g., UE 104 in FIG. 1), a source master node 1006 (shown in FIG. 10 as, "S-MN"), a source secondary node 1007 ("shown in FIG. 10 as, "S-SN"), a target secondary node 1008 (shown in FIG. 10 as, "T-SN"), and a target master node 1009 (shown in FIG. 10 as, T-MN"). In some embodiments, the S-MN 1006, the S-SN 1007, T-SN 1008, the T-MN 1009 may each be a wireless communication node having identical or similar functionality as the BS 102 in FIG. 1. Although FIG. 10 illustrates only one single target MN (e.g., T-MN 1009) and one single target SN (e.g., T-SN 1007), one of ordinary skill in the art could recognize that multiple target nodes could be considered during the procedure. For the legacy handover without SN change, S-SN 1007 and T-SN 1008 may be the same node.

At operation S801, the source MN 1006 may send a HO Request to the target MN 1009.

At operation S802, if the target MN 1009 admits HO request and decides to configure a cascaded CPC, then the target MN 1009 may send an SN Addition Request to the target SN 1008 including an indicator of CPAC.

At operation S803, the (target) SN may respond with an SN Addition Request Acknowledge including one or more candidate PSCell identification information (e.g., PSCell frequency+PCI; Cell ID; CGI).

At operation S804, the target MN 1009 may send a Handover Request Acknowledge including cascaded CPC configuration (i.e., including the configuration of the target PSCell and the corresponding CPC execution condition for target PSCell frequency) to the source MN 1006.

include the configuration of the target PSCell and the corresponding CPC execution condition for target PSCell frequency.

Operation S808/S809 may, in some embodiments, be the same as operations S610/S611 in FIG. 8.

Operation S810 through S813 may, in some embodiments, be the same as operations S613-S616 in FIG. 8.

3.1.8. Example Embodiment(s): Legacy HO with Cascaded Conditional PSCell Addition/Activation (CPA)

FIG. 11 illustrates a flow diagram of an example environment for PCell CHO with cascaded conditional PSCell addition/activation, in accordance with some embodiments of the present disclosure. The example environment 1100 includes a UE 1104 (e.g., UE 104 in FIG. 1), a source master node 1106 (shown in FIG. 11 as, "S-MN"), a target secondary node 1108 (shown in FIG. 11 as, "T-SN"), and a target master node 1109 (shown n FIG. 11 as, T-MN"). In some embodiments, the S-MN 1106, T-SN 1108, the T-MN 1109 may each be a wireless communication node having identical or similar functionality as the BS 102 in FIG. 1. Although FIG. 11 illustrates only one single target MN (e.g., T-MN 1109) and one single target SN (e.g., T-SN 1107), one of ordinary skill in the art could recognize that multiple target nodes could be considered during the procedure.

Operation S901 through operation S904 may, in some embodiments, be the same as operations S801 through S804 in FIG. 10.

Operation S905 through operation S911 may, in some embodiments, be the same as operations S807-S813 in FIG. 10.

An example signaling structure of the RRCReconfiguration message transferred in S807/S905 may be as follows:

An example for signaling structure of the RRCReconfiguration message is shown in FIG. A. The RRCReconfiguration message includes the conditionalReconfiguration and some other reconfiguration generated by the source MN (without reconfigurationWithSync). The conditionalReconfiguration for CHO contains the index, execution conditions for the target PCell frequency, and the conditionalReconfiguration container containing the RRCReconfiguration generated by the target MN, which includes the target cell configuration (with reconfigurationWithSync) and the cascaded conditionalReconfiguration for CPAC. The cascaded conditionalReconfiguration for CPAC contains the index, execution conditions for the target PSCell frequency, and the conditionalReconfiguration container containing the RRCReconfiguration generated by the target MN, which includes SCG configuration and may include MCG configuration (without reconfigurationWithSync). The SCG configuration generated by the target SN is encapsulated in the nr-SCG, which is included in the MRDC-SecondaryCellGroupConfig.

Upon successful completion of CHO execution or normal HO execution, in some embodiments, the UE may release invalid CPAC containers (i.e. including delta SCG configuration based on old SCG configuration) and associated CPAC measurement configurations, and then send an indication to inform the NW to release the corresponding CPAC configuration. If there are still valid CPAC containers, the UE should restart monitoring CPAC execution conditions.

The indication, in some embodiments, may be a release indicator (e.g., "conditionalReconfiguration-Release" or "cpac-release").

The indication, in some embodiments, may be a release indicator (e.g., "conditionalReconfiguration-Release" or "cpac-release")+released cell information (e.g., candidate PSCell PCI+frequency; candidate cell ID; candidate CHO/CPAC configuration index).

---

RRCReconfiguration message

---

```
->other reconfiguration generated by the MN (with reconfigurationWithSync)
->conditionalReconfiguration
  -->conditionalReconfiguration index
  -->execution condition configuration for the target PSCell frequency
  -->conditionalReconfiguration container
     ---> RRCReconfiguration message generated by target MN
       ----> MRDC-SecondaryCellGroupConfig
         ----->nr-SCG (CONTAINING RRCReconfiguration generated by target SN)
```

---

3.2. UE Behavior when Both CHO and CPAC are Configured

The CHO and CPAC may be separately configured to the UE. If both CHO and CPAC are configured, then the UE may need to monitor the trigger conditions associated with candidate PCell and PSCell at the same time. The normal HO may also be configured before triggering the execution of CPAC. The normal PSCell addition or change may also be configured before triggering the execution of CHO. But, in some embodiments, only one procedure (either CHO/normal HO or CPAC) may be triggered at one time. There are three cases: (1) triggering conditions for when CHO is firstly met or the normal HO is executed firstly, (2) triggering conditions for when CPAC is firstly met or the normal PSCell addition or change is executed firstly, and (3) triggering conditions for when CHO and CPAC are met at the same time.

3.2.1 Triggering Conditions for when CHO is Firstly Met or the Normal HO is Executed Firstly In case the triggering condition of CHO is met firstly or the normal HO is executed firstly, the UE should trigger the CHO execution or the normal HO execution and stop monitoring the execution condition of CPAC. Given that PCell change may initiate SN key change, the stored SCG configuration for CPAC may become invalid. Even if there is no SN key change, the delta SCG configuration may be included in the CHO configuration. Once the new SCG configuration is applied due to CHO execution, the stored conditional SCG configuration may also become valid, except the full SCG configuration is used for CPAC.

Upon successful completion of CHO execution or normal HO execution, in some embodiments, the UE may release all the stored CPAC containers and associated CPAC measurement configurations, and then send an indication to inform the NW to release all CPAC configuration.

The indication, in some embodiments, may be the released cell information (e.g., candidate PSCell PCI+frequency; candidate cell ID; candidate CHO/CPAC configuration index).

The indication, in some embodiments, may be transferred to the network (e.g., BS 102 in FIG. 1) via the UE sending the indication to the MN via a RRC signaling (e.g. RRCReconfigurationComplete/RRCConnectionReconfigurationComplete, ULInformationTransferMRDC or a new RRC message). In response, the MN may transfer the release indication to SN via X2/Xn signaling if needed (i.e., in case the CPAC is configured by the SN via SRB3).

The release indication, in some embodiments, may be transferred to the SN by including the indication directly in the SN(SgNB) Modification Confirm or SN(SgNB) Change Confirm message. That is, include the indicator as one information element in the SN(SgNB) Modification Confirm or SN(SgNB) Change Confirm message.

The release indication, in some embodiments, may be transferred to the SN by including the indication in a RRC message (e.g., CG-ConfigInfo message). The RRC message may be included as one information element in the SN(SgNB) Modification Confirm or SN(SgNB) Change Confirm message.

The indication, in some embodiments, may be transferred to the network (e.g., BS 102 in FIG. 1) via the UE directly sending the indication to the SN via a RRC signaling (e.g., RRCReconfigurationComplete, or a new RRC message) over SRB3.

3.2.1.1. Release all CPAC Configurations and Send Indication to the MN

Upon successful completion of CHO execution or normal HO execution, in some embodiments (sometimes referred to as, "Step 1"), the UE may release all the stored CPAC containers and CPAC associated measurement configurations.

The UE, in some embodiments (sometimes referred to as, "Step 2"), may send an RRC message (e.g., RRCReconfigurationComplete/RRCConnectionReconfigurationComplete, ULInformationTransferMRDC or a new RRC message) including the release indication (e.g., a release indicator) to the MN.

The MN, in some embodiments (sometimes referred to as, "Step 3"), may send a SN(SgNB) Modification Confirm or SN(SgNB) Change Confirm message including the release indication (e.g., a release indicator) to the SN.

3.2.1.2. Release all CPAC Configurations and Send Indication to the SN

Upon successful completion of CHO execution or normal HO execution, in some embodiments (sometimes referred to as, "Step 1"), the UE may release all the stored CPAC containers and CPAC associated measurement configurations.

The UE, in some embodiments (sometimes referred to as, "Step 1"), may send an RRC message (e.g., RRCReconfigurationComplete or a new RRC message) including the release indication (e.g., a release indicator) to the SN.

3.2.1.3. Release Invalid CPAC Configurations and Send Release Indication to the MN Upon successful completion of CHO execution or normal HO execution, in some embodiments (sometimes referred to as, "Step 1"), the UE releases invalid CPAC containers (i.e., including delta SCG configuration based on old SCG configuration) and associated CPAC measurement configurations, and then restart monitoring corresponding CPAC execution conditions if there are still valid CPAC containers.

The UE, in some embodiments (sometimes referred to as, "Step 2"), may send an RRC message (e.g., RRCReconfigurationComplete/RRCConnectionReconfigurationComplete, ULInformationTransferMRDC or a new RRC message) including the release indication (e.g., a release indicator+released cell information, or released cell information) to the MN.

The MN, in some embodiments (sometimes referred to as, "Step 3"), may send a SN(SgNB) Modification Confirm or SN(SgNB) Change Confirm message including the release indication (e.g., a release indicator+released cell information, or released cell information) to the SN.

3.2.1.4. Release Invalid CPAC Configurations and Send Release Indication to the SN Upon successful completion of CHO execution or normal HO execution, in some embodiments (sometimes referred to as, "Step 1"), the UE may release invalid CPAC containers (i.e., including delta SCG configuration based on old SCG configuration) and associated CPAC measurement configurations, and/or restart monitoring corresponding CPAC execution conditions if there are still valid CPAC containers.

The UE, in some embodiments (sometimes referred to as, "Step 2"), may send a RRC message (e.g., RRCReconfigurationComplete or a new RRC message) including the release indication (e.g., a release indicator+released cell information, or released cell information) to the SN.

3.2.2. Triggering Conditions for when CPAC is Firstly Met or the Normal PSCell Addition/Change is Executed Firstly In case the triggering condition of CPAC is met firstly or the normal PSCell addition/change is executed firstly, the UE should trigger the CPAC execution or normal PSCell addition/change execution but still keep monitoring the execution condition of CHO. When the UE successfully completes the CPAC execution or the normal PSCell addition/change execution, the stored CHO configuration may become invalid since the new SCG configuration is applied to the UE but the delta SCG configuration included in the stored CHO configuration is based on the old SCG configuration. Thus the UE may need to release the stored CHO configuration and inform the MN upon successful completion of CPAC execution Upon successful completion of CPAC execution or the normal PSCell addition/change execution, the UE may release all the stored CHO containers and CHO associated measurement configurations, and then inform the NW to release all CHO configuration.

Upon successful completion of CPAC execution or the normal PSCell addition/change execution, the UE may release invalid CHO containers (i.e. including delta configuration based on old SCG configuration) and associated CHO measurement configurations, and then inform the NW to release the corresponding CHO configuration.

The indication may be one a release indicator (e.g., "conditionalReconfiguration-Release" or "cho-release").

The indication may be one a release indicator (e.g., "conditionalReconfiguration-Release" or "cho-release")+released cell information (e.g., candidate PCell PCI+frequency; candidate cell ID; candidate CHO/CPAC configuration index).

The indication may be the released cell information (e.g., candidate PCell PCI+frequency; candidate cell ID; candidate CHO/CPAC configuration index).

The indication may be transferred to the network (e.g., BS 102 in FIG. 1) via the UE sending the indication to the target SN via a RRC signaling over SRB3 (e.g., RRCReconfigurationComplete, ULInformationTransferMRDC or a new RRC message), and then the SN transfers the indication to MN via X2/Xn signaling.

The release indication may be transferred to the MN by including the indication directly in the SN(SgNB) Modification Confirm or SN(SgNB) Change Confirm message. That is, by including the indicator as one information element in the SN(SgNB) Modification Required or SN(SgNB) Change Required message.

The release indication may be transferred to the MN by including the indication in a RRC message (e.g., CG-Config message). The RRC message may be included as one information element in the SN(SgNB) Modification Required or SN(SgNB) Change Required message.

The indication may be transferred to the network via the UE directly sending the indication to the MN via a RRC signaling (e.g., RRCReconfigurationComplete/RRCConnectionReconfigurationComplete, ULInformationTransferMRDC or a new RRC message).

3.2.2.1. Release all CHO Configurations and Send Release Indication to the SN Upon successful completion of CPAC execution or the normal PSCell addition/change execution, in some embodiments (sometimes referred to as, "Step 1"), the UE may release all the stored CHO containers and CHO associated measurement configurations.

The UE, in some embodiments (sometimes referred to as, "Step 1"), may send a RRC message (e.g., RRCReconfigurationComplete, ULInformationTransferMRDC or a new RRC message) including the release indication (e.g., a release indicator) to the SN.

The SN, in some embodiments (sometimes referred to as, "Step 1"), may send a SN(SgNB) Modification Required or SN(SgNB) Change Required message including the release indication (e.g., a release indicator) to the MN.

3.2.2.2. Release all CHO Configurations and Send Release Indication to the MN Upon successful completion of CPAC execution or the normal PSCell addition/change execution, in some embodiments (sometimes referred to as, "Step 1"), the UE may release all the stored CPAC containers and CPAC associated measurement configurations.

The UE, in some embodiments (sometimes referred to as, "Step 2"), may send a RRC message (e.g., RRCReconfigurationComplete/RRCConnectionReconfigurationComplete, ULInformationTransferMRDC or a new RRC message) including the release indication (e.g., a release indicator) to the MN.

3.2.2.3. Release Invalid CHO Configuration and Send Release Indication to the SN Upon successful completion of CPAC execution or the normal PSCell addition/change execution, in some embodiments (sometimes referred to as, "Step 1"), the UE may release invalid CHO containers (i.e., including delta configuration based on old SCG configuration) and associated CHO measurement configurations.

The UE, in some embodiments (sometimes referred to as, "Step 2"), may send an RRC message (e.g. RRCReconfigurationComplete, ULInformationTransferMRDC or a new RRC message) including the release indication (e.g. a release indicator+released cell information, or released cell information) to the SN;

The SN, in some embodiments (sometimes referred to as, "Step 3"), may send a SN(SgNB) Modification Required or SN(SgNB) Change Required message including the release indication (e.g., a release indicator+released cell information, or released cell information) to the MN.

3.2.2.4. Release Invalid CHO Configuration and Send Release Indication to the MN Upon successful completion of CPAC execution or the normal PSCell addition/change execution, in some embodiments (sometimes referred to as, "Step 1"), the UE may release invalid CHO containers (i.e., including delta configuration based on old SCG configuration) and associated CHO measurement configurations.

The UE, in some embodiments (sometimes referred to as, "Step 1"), may send an RRC message (e.g., RRCReconfigurationComplete/RRCConnectionReconfigurationComplete, ULInformationTransferMRDC or a new RRC message) including the release indication (e.g., a release indicator+released cell information, or released cell information) to the MN.

3.2.3. Triggering Conditions for when CHO and CPAC are Met at the Same Time

Considering that PCell handover (HO) may trigger the SN key change, the conditional PSCell configuration may no longer be valid when a new PCell configuration is applied.

Thus, when the trigger conditions for both CHO and CPAC are met simultaneously, the UE should prioritize CHO execution. The UE may follow the same behavior as the instance of when triggering conditions for CHO are firstly met.

3.3. Methods for Implementing a Coexistence of the CHO/CPAC Procedures

FIG. 12A is a flow diagram depicting a method for improving mobility performance from the perspective of a master node, in accordance with some embodiments of the present disclosure. Additional, fewer, or different operations may be performed in the method depending on the particular embodiment. In some embodiments, some or all operations of method 1200A may be performed by a wireless communication node, such as BS 102 in FIG. 1. In some operations, some or all operations of method 1200A may be performed by a wireless communication device, such as UE 104 in FIG. 1. Each operation may be re-ordered, added, removed, or repeated.

As shown, the method 1200A includes, in some embodiments, the operation 1202A of receiving, by a target master wireless communication node (MN) from a source master wireless communication node (MN), a handover request to begin a handover procedure. The method includes, in some embodiments, the operation 1204A of transmitting, by the target MN to a target secondary wireless communication node (SN), a first message to inform the target SN about a type of SN addition or change procedure to perform the handover request, wherein the first message causes the target SN to send a second message to the target MN to inform the target MN of one or more configured primary secondary (PSCells).

FIG. 12B is a flow diagram depicting a method for improving mobility performance from the perspective of a master node, in accordance with some embodiments of the present disclosure. Additional, fewer, or different operations may be performed in the method depending on the particular embodiment. In some embodiments, some or all operations of method 1200B may be performed by a wireless communication node, such as BS 102 in FIG. 1. In some operations, some or all operations of method 1200B may be performed by a wireless communication device, such as UE 104 in FIG. 1. Each operation may be re-ordered, added, removed, or repeated.

As shown, the method 1200B includes, in some embodiments, the operation 1202B of transmitting, from a master wireless communication node (MN) to a secondary wireless communication node (SN), a first message to release the SN and inform that a conditional handover (CHO) was configured for a wireless communication device; wherein the first message causes the SN to: maintain a data transmission with the wireless communication device before triggering the execution of CHO and transmit a second message to the source MN. The method includes, in some embodiments, the operation 1204B of receiving, by the source MN from the source SN, the second message.

FIG. 12C is a flow diagram depicting a method for improving mobility performance from the perspective of a wireless communication device, in accordance with some embodiments of the present disclosure. Additional, fewer, or different operations may be performed in the method depending on the particular embodiment. In some embodiments, some or all operations of method 1200C may be performed by a wireless communication node, such as BS 102 in FIG. 1. In some operations, some or all operations of method 1200C may be performed by a wireless communication device, such as UE 104 in FIG. 1. Each operation may be re-ordered, added, removed, or repeated.

As shown, the method 1200C includes, in some embodiments, the operation 1202C of performing, by a wireless communication device, a conditional handover (CHO) or a normal handover until a successful completion. The method includes, in some embodiments, the operation 1204B of removing, by the wireless communication device responsive to performing the CHO until the successful completion, a conditional primary secondary cell addition or change (CPAC) container and one or more CPAC measurement configurations associated with the CPAC container stored in the wireless communication device. The method includes, in some embodiments, the operation 1204C of transmitting, by the wireless communication device, a radio resource control (RRC) message to a wireless communication node to inform that the wireless communication device released a CPAC configuration associated with the CPAC container.

4. Coexistence of CHO and DAPS Procedures

To reduce mobility interruption, a Dual Active Protocol Stack (DAPS) based handover procedure is promoted. In the DAPS based handover procedure, the UE keeps simultaneous connection with the source cell and target cell until releasing the source cell after successful random access to the target cell.

4.1. Inform the HO Type/Selected Target Cell to the Network

Although the source node can request to perform DAPS HO, the target node may decide to fall-back to legacy HO. So in case the source node requests CHO+DAPS, some target nodes may feedback CHO+DAPS and other target nodes may feedback CHO+legacy HO. However, in case of DAPS HO, the source node may need to downgrade the source configuration before performing DAPS HO to ensure the source and target configuration does not exceeds the UE capability.

Thus, if the source node wants to request CHO+DAPS to the target node, the source node may need to generate and send two sets of configuration (i.e., the original source configuration and the downgraded source configuration) to the target node via HO Request message. Then, the target node can generate the target configuration based on the original source configuration or the downgraded source configuration, according to whether DAPS HO is admitted. If the target node determines to perform DAPS HO, the target configuration can be generated based on the downgraded source configuration. If the target node determines to fallback to legacy HO, the target configuration based can be generated based on the original source configuration. In response, the target node may send the target configuration to the source node via HO Request Acknowledge message. In response, the source node may transfer the target configuration encapsulated in the CHO container to the UE via an RRCReconfiguration message. Since multiple candidate cells can be pre-configured in CHO, the UE may receive some CHO containers including normal HO configuration, others including DAPS HO configuration. The UE may store the received CHO containers and/or start to evaluate the CHO execution condition for the target cell. If the CHO execution condition if fulfilled, the UE may apply the corresponding configuration and/or perform a handover to the target cell.

However, the source node stores two sets of configuration, it has no idea of whether the downgraded source configuration needs to be used during HO or not and when to apply the downgraded source configuration if needed. So the UE may need to inform the NW upon the execution condition is fulfilled.

If the execution condition(s) are met, then the UE may send an indication to the source node via a RRC message (e.g., RRCReconfigurationComplete message or a new RRC message) to inform whether to apply the downgraded source configuration or not.

The indication, in some embodiments, may be an indicator of the type of HO to be triggered (e.g., "daps-HO")

The indication, in some embodiments, may the selected candidate cell information (e.g., PCI+frequency; candidate cell ID; candidate CHO configuration index).

The source node may determine whether to apply the downgraded source configuration or not, according to the indicated cell information.

Responsive to receiving the confirmation of the message from the source node, the UE may start to perform access to the target cell.

Figure 13:
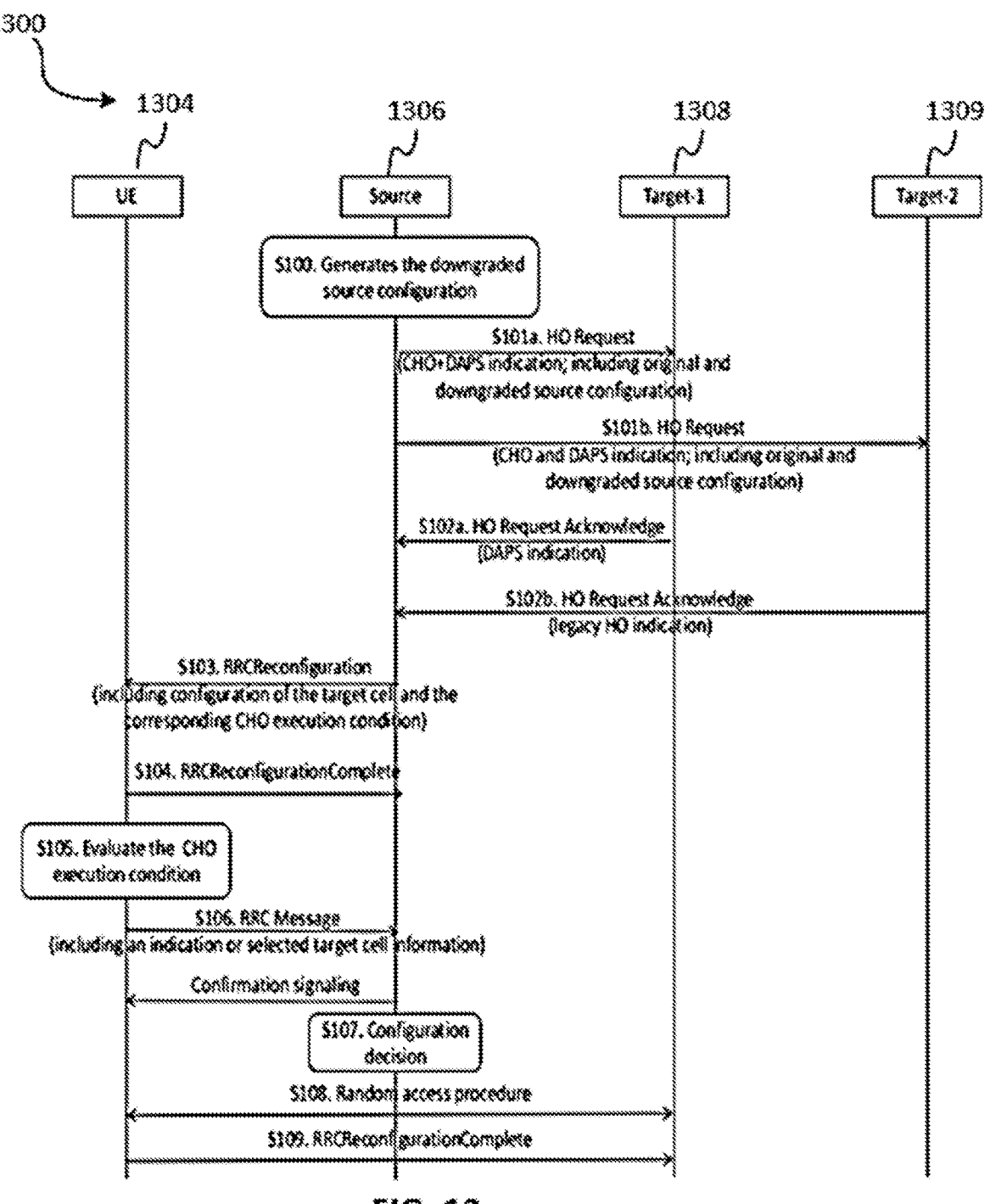
FIG. 13 illustrates a flow diagram of an example environment for CHO+DAPS, in accordance with some embodiments of the present disclosure.

FIG. 13 illustrates a flow diagram of an example environment for CHO+DAPS, in accordance with some embodiments of the present disclosure. The example environment 1300 includes a UE 1304 (e.g., UE 104 in FIG. 1), a source cell 1306 (shown in FIG. 11 as, "Source"), a target cell 1308 (shown in FIG. 13 as, "Target-1"), and a target cell 1309 (shown in FIG. 13 as, Target-2"). In some embodiments, the source cell 1306, the target cell 1308, and the target cell 1309 may each be a wireless communication node having identical or similar functionality as the BS 102 in FIG. 1. Although FIG. 13 illustrates only two target cells, one of ordinary skill in the art could recognize that multiple target cells could be considered during the procedure.

At operation S100, the source cell may decide to trigger CHO+DAPS, and/or generate the downgraded source configuration.

At operation S101*a/b*, the source cell may send a HO Request to the target cell including CHO and DAPS indication, both original and downgraded source configuration, etc.

At operation S102*a*, the target cell may admit CHO and DAPS, and/or generate the target configuration based on the downgraded source configuration. The target cell may send a HO Request Acknowledge to the source cell including a DAPS indication.

At operation S102*b*, the target cell may admit CHO but decides to fall-back to legacy HO, and generates the target configuration based on the original source configuration. The target cell may send an HO Request Acknowledge to the source cell including a legacy HO indication.

At operation S103, the source cell may send an RRCReconfiguration message with CHO configuration to the UE. The CHO configuration including the configuration of the target cell (may also include DAPS indication) and the corresponding CHO execution condition of the target cell.

At operation S104, the UE may send an RRCReconfigurationComplete message to the source cell.

At operation S105, the UE may maintain a connection with source cell after receiving the RRCReconfiguration message, and starts to evaluate the CHO execution condition for the target cell. If the CHO execution condition is fulfilled, then the UE may apply the corresponding configuration received in S103.

At operation S106, the UE may send an RRC message (e.g., RRCReconfigurationComplete message or a new RRC message) to the source cell including an indication (e.g., an indicator of the type of the HO to be triggered, or the selected candidate cell information).

At operation S107, the source cell may decide whether to apply the downgraded source configuration or not based on the received indication. If receiving a DAPS indication or the DAPS cell information, the source cell may apply the downgraded source configuration. Otherwise, the source cell maintain the current configuration.

At operation S108, upon reception of the confirmation of the RRC message, the UE may trigger random access procedure to the target cell.

At operation S109, the UE may send RRCReconfigurationComplete message to the target cell.

4.2. Failure Handling in CHO+DAPS

In case both the handover failure and the source link failure occur, the UE starts timer T311 and performs cell selection. If the selected cell is a CHO candidate and the network configured the UE to try CHO at the selected CHO candidate cell after RLF, the UE applies stored CHO configuration for that selected cell; otherwise it performs reestablishment. However, if the selected cell is a CHO+DAPS cell, the UE should fallback to initiate legacy HO since the source link is not available to perform DAPS HO.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
receiving, by a target master wireless communication node (MN) from a source master wireless communication node (MN), a handover request to begin a handover procedure;
transmitting, by the target MN to a target secondary wireless communication node (SN), a first message to inform the target SN about a type of SN addition or change procedure to perform the handover request, the type of SN addition or change procedure selected from among a first type comprising a conditional primary secondary cell addition or change (CPAC) procedure or a second type comprising a primary secondary cell (PSCell) addition or change for a conditional handover (CHO) procedure;
receiving, by the target MN from the target SN, a second message which informs the target MN of one or more configured PSCells; and
transmitting, by the target MN to the source MN, a handover request acknowledge message which includes the one or more configured PSCells.

2. The method of claim 1, wherein the target MN transmits the first message to the target SN via X2 or Xn signaling, wherein the first message includes an information element that includes a CPAC indicator or a PSCell addition or change for CHO indicator.

3. The method of claim 1, wherein the source MN sends an indicator to a source SN via X2 or Xn signaling, and the source SN starts data forwarding, wherein the indicator comprises a CHO indicator.

4. The method of claim 1, wherein the handover request includes a CHO indicator.

5. A target master wireless communication node (MN), comprising: at least one processor and a transceiver configured to:
receive, from a source master wireless communication node (MN), a handover request to begin a handover procedure; and
transmit, to a target secondary wireless communication node (SN), a first message to inform the target SN about a type of SN addition or change procedure to perform the handover request, the type of SN addition or change procedure selected from among a first type comprising a conditional primary secondary cell addition or change (CPAC) procedure or a second type comprising a primary secondary cell (PSCell) addition or change for a conditional handover (CHO) procedure;

receive, from the target SN, a second message which informs the target MN of one or more configured PSCells; and
transmit, to the source MN, a handover request acknowledge message which includes the one or more configured PSCells.

6. The target MN of claim 5, wherein the target MN transmits the first message to the target SN via X2 or Xn signaling, wherein the first message includes an information element that includes a CPAC indicator or a PSCell addition or change for CHO indicator.

7. The target MN of claim 5, wherein the source MN sends an indicator to a source SN via X2 or Xn signaling, and the source SN starts data forwarding, wherein the indicator comprises a CHO indicator.

8. The target MN of claim 5, wherein the handover request includes a CHO indicator.

9. A method comprising:
transmitting, by a source master wireless communication node (MN) to a target master wireless communication node (MN), a handover request to begin a handover procedure,
wherein the target MN transmits to a target secondary wireless communication node (SN), a first message to inform the target SN about a type of SN addition or change procedure to perform the handover request, the type of SN addition or change procedure selected from among a first type comprising a conditional primary secondary cell addition or change (CPAC) procedure or a second type comprising a primary secondary cell (PSCell) addition or change for a conditional handover (CHO) procedure, and receives, from the source SN, a second message which informs the target MN of one or more configured PSCells; and
receiving, by the source MN from the target MN, a handover request acknowledge message which includes the one or more configured PSCells.

10. The method of claim 9, wherein the target MN transmits the first message to the target SN via X2 or Xn signaling, wherein the first message includes an information element that includes a CPAC indicator or a PSCell addition or change for CHO indicator.

11. The method of claim 9, wherein the source MN sends an indicator to a source SN via X2 or Xn signaling, and the source SN starts data forwarding, wherein the indicator comprises a CHO indicator.

12. The method of claim 9, wherein the handover request includes a CHO indicator.

13. A source master wireless communication node (MN), comprising: at least one processor and a transceiver configured to:
transmit, to a target master wireless communication node (MN), a handover request to begin a handover procedure,
wherein the target MN transmits to a target secondary wireless communication node (SN), a first message to inform the target SN about a type of SN addition or change procedure to perform the handover request, the type of SN addition or change procedure selected from among a first type comprising a conditional primary secondary cell addition or change (CPAC) procedure or a second type comprising a primary secondary cell (PSCell) addition or change for a conditional handover (CHO) procedure, and receives, from the source SN, a second message which informs the target MN of one or more configured PSCells; and receive, from the target MN, a handover request acknowl-
edge message which includes the one or more config-
ured PSCells.

14. The source MN of claim 13, wherein the target MN transmits the first message to the target SN via X2 or Xn signaling, wherein the first message includes an information element that includes a CPAC indicator or a PSCell addition or change for CHO indicator.

15. The source MN of claim 13, wherein the transceiver is configured to send an indicator to a source SN via X2 or Xn signaling, and the source SN starts data forwarding, wherein the indicator comprises a CHO indicator.

16. The method of claim 13, wherein the handover request includes a CHO indicator.

* * * * *